(12) United States Patent
Wada et al.

(10) Patent No.: US 12,730,901 B2
(45) Date of Patent: Sep. 8, 2026

(54) ASSESSMENT APPARATUS AND ASSESSMENT METHOD

(71) Applicant: Panasonic Automotive Systems Co., Ltd., Kanagawa (JP)

(72) Inventors: Hiroyuki Wada, Kyoto (JP); Yusuke Nemoto, Hyogo (JP); Teruyoshi Hasegawa, Hyogo (JP); Kotone Tomiie, Osaka (JP); Shoichiro Sekiya, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 46 days.

(21) Appl. No.: 18/952,388

(22) Filed: Nov. 19, 2024

(65) Prior Publication Data

US 2025/0190584 A1 Jun. 12, 2025

(30) Foreign Application Priority Data

Dec. 11, 2023 (JP) ................................ 2023-208864
Aug. 8, 2024 (JP) ................................ 2024-131786

(51) Int. Cl.
*G06F 21/57* (2013.01)
*G06F 21/55* (2013.01)

(52) U.S. Cl.
CPC .......... *G06F 21/577* (2013.01); *G06F 21/554* (2013.01)

(58) Field of Classification Search
CPC ...... G06F 21/577; G06F 21/554; G06F 21/55; G06F 21/56; G06F 21/57; H04L 63/14; H04L 63/1433; H04L 63/1441
See application file for complete search history.

(56) References Cited

U.S. PATENT DOCUMENTS 9,276,951 B2 * 3/2016 Choi .................. H04L 63/1433
12,445,474 B1 * 10/2025 Reed .................... H04L 67/535

(Continued)

FOREIGN PATENT DOCUMENTS

CN 116362543 6/2023
JP 2020-155098 9/2020

(Continued)

OTHER PUBLICATIONS

ISO/SAE 21434 Road vehicles—Cybersecurity engineering, ISO/SAE International, Aug. 2021.

(Continued)

*Primary Examiner* — Malcolm Cribbs
(74) *Attorney, Agent, or Firm* — Greenblum & Bernstein, P.L.C.

(57) ABSTRACT

An assessment apparatus is an apparatus that assesses an assessment target device that includes physical components for executing processing appropriate to logical components. The assessment apparatus includes an input unit that acquires device information about the assessment target device; a path determiner that determines, based on the device information, a logical path including an array of one or more logical components and a physical path corresponding to the logical path and including an array of one or more physical components, the logical and physical paths being paths of access to an asset (data or a function) of the assessment target device from the outside thereof; and a risk re-assessment unit that assesses a risk value of the asset in accordance with an attack feasibility level indicating attack feasibility for the determined physical and logical paths and an influence level indicating an influence to be exerted when the asset is invaded.

9 Claims, 11 Drawing Sheets

(56) References Cited

U.S. PATENT DOCUMENTS

| | | | | |
|---|---|---|---|---|
| 2020/0226266 | A1* | 7/2020 | Fukami | G06F 21/577 |
| 2020/0304534 | A1 | 9/2020 | Rakesh et al. | |
| 2021/0105294 | A1* | 4/2021 | Kruse | H04L 63/1416 |
| 2023/0208882 | A1* | 6/2023 | Crabtree | H04L 63/1408 726/22 |
| 2024/0193273 | A1 | 6/2024 | Wada et al. | |
| 2024/0265113 | A1* | 8/2024 | Napper | G06F 21/552 |

FOREIGN PATENT DOCUMENTS

| | | |
|---|---|---|
| JP | 2022-100815 | 7/2022 |
| JP | 2023-47569 | 4/2023 |
| JP | 2023-92689 | 7/2023 |

OTHER PUBLICATIONS

Notice of Reasons for Refusal dated Oct. 15, 2024 issued in Japanese Patent Application No. 2024-131786 with corresponding English translation.

* cited by examiner

FIG. 1

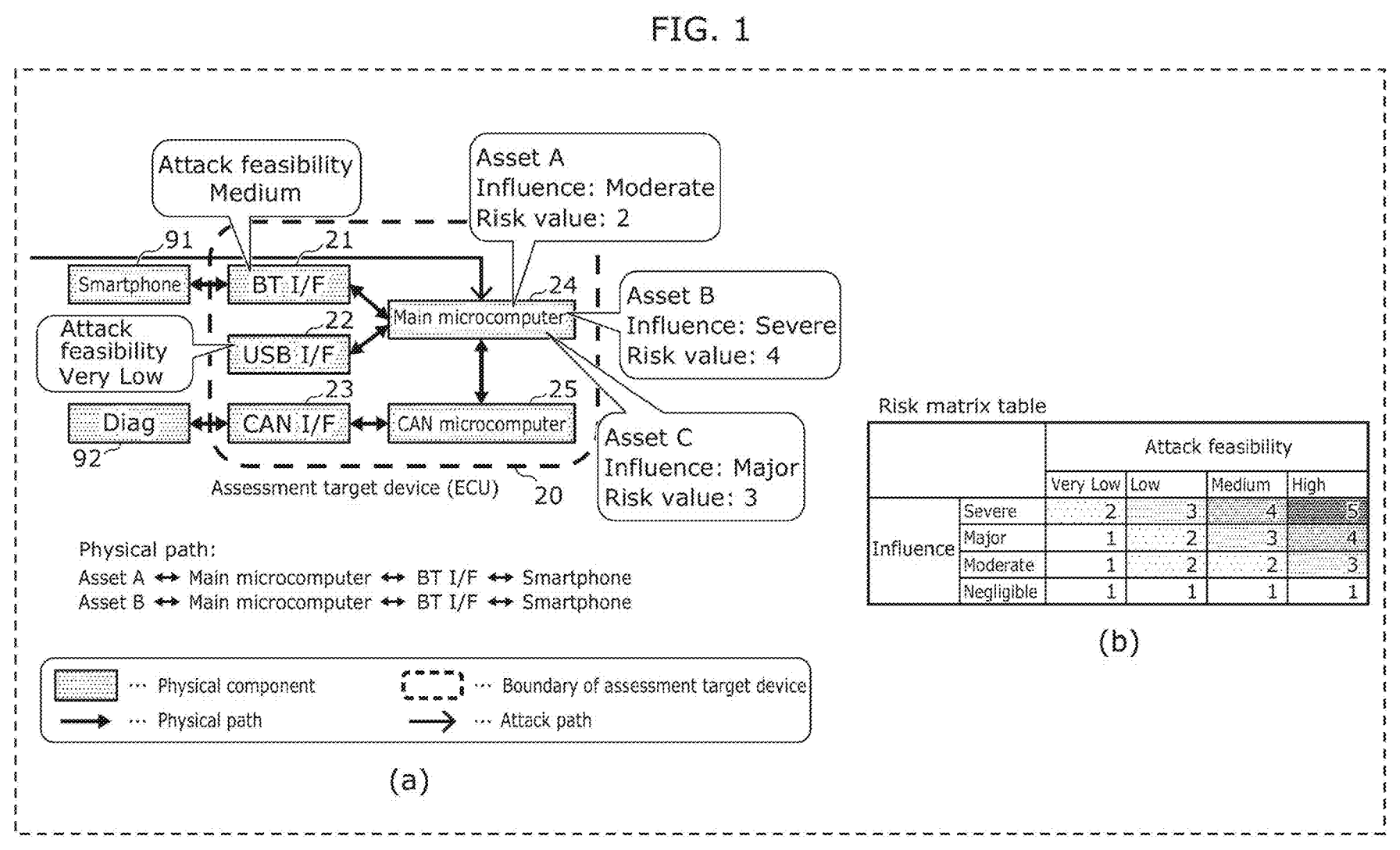

Attack feasibility Medium
91
21
Smartphone
BT I/F
22
USB I/F
Attack feasibility Very Low
23
CAN I/F
Diag
92
24
Main microcomputer
25
CAN microcomputer
Assessment target device (ECU)
20
Asset A
Influence: Moderate
Risk value: 2
Asset B
Influence: Severe
Risk value: 4
Asset C
Influence: Major
Risk value: 3

Physical path:
Asset A ↔ Main microcomputer ↔ BT I/F ↔ Smartphone
Asset B ↔ Main microcomputer ↔ BT I/F ↔ Smartphone ··· Physical component
··· Boundary of assessment target device
··· Physical path
··· Attack path (a)

Risk matrix table

| | | Attack feasibility | | | |
|---|---|---|---|---|---|
| | | Very Low | Low | Medium | High |
| Influence | Severe | 2 | 3 | 4 | 5 |
| | Major | 1 | 2 | 3 | 4 |
| | Moderate | 1 | 2 | 2 | 3 |
| | Negligible | 1 | 1 | 1 | 1 |

(b)

(a)
Smartphone
91
BT I/F
21
Main microcomputer
24
Virtualization board (HV)
31
BT driver
32
First OS
35
First function
38
(b)
External device
90
USB I/F
22
Main microcomputer
24
Virtualization board (HV)
31
USB driver
33
Second OS
36
Second function
39
(c)
External device
90
USB I/F
22
Main microcomputer
24
Virtualization board (HV)
31
USB driver
33
Second OS
36
Container
37
Third function
40
Physical path
Logical path Assessment apparatus
10a
Input unit
11
Path determiner
12
Separation-settings identifier
12a
Path combiner
12b
Risk re-assessment unit (assessment unit)
13
Output unit
14
Priority determiner
15
Logical configuration information
D1
Threat analysis information
D2
Device information
Vulnerability assessment information
D4
Vulnerability priority information
D5

FIG. 7

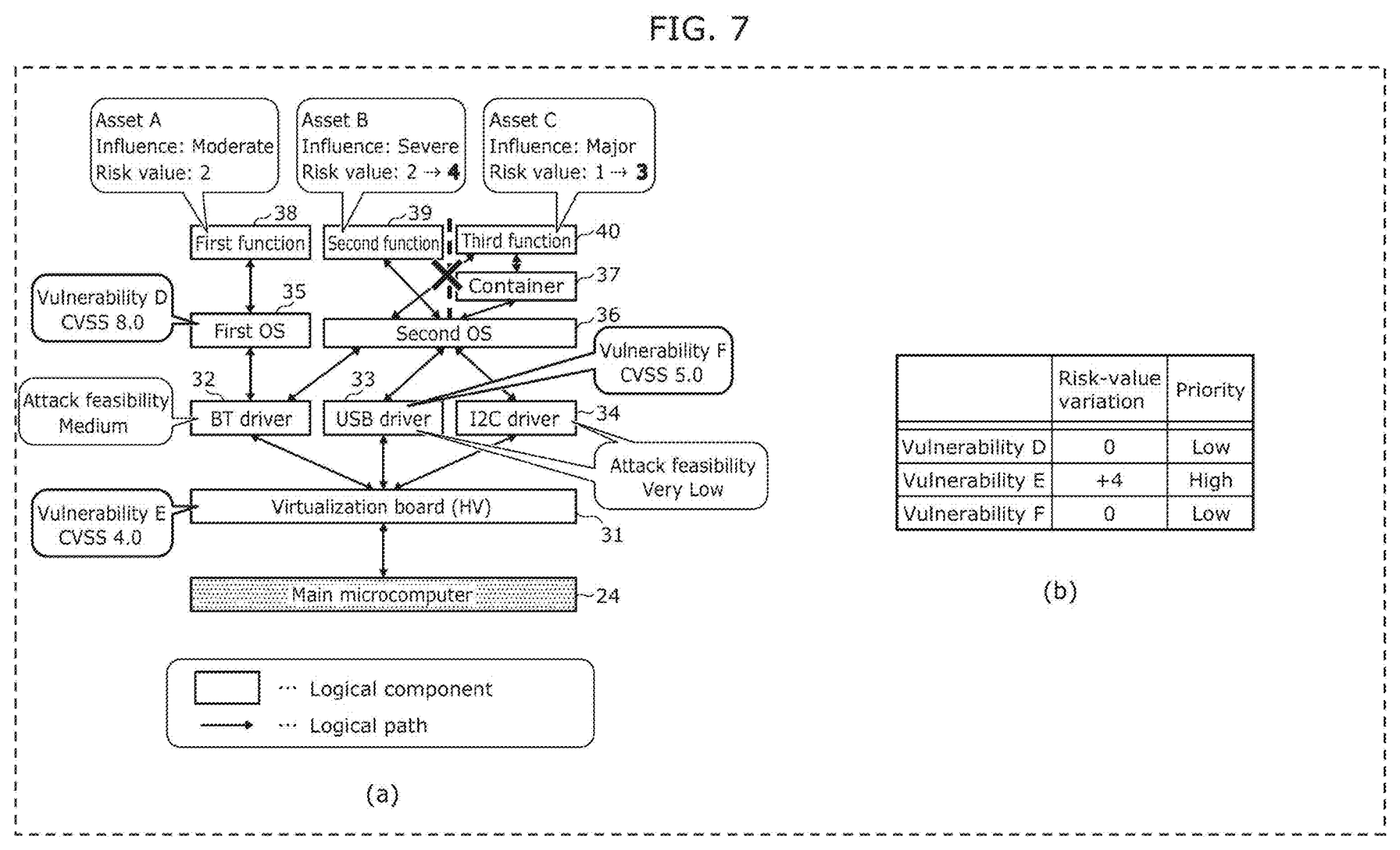

Asset A
Influence: Moderate
Risk value: 2

Asset B
Influence: Severe
Risk value: 2 → 4

Asset C
Influence: Major
Risk value: 1 → 3

38 First function
39 Second function
40 Third function
37 Container
35 First OS
36 Second OS
32 BT driver
33 USB driver
34 I2C driver
31 Virtualization board (HV)
24 Main microcomputer Vulnerability D
CVSS 8.0

Attack feasibility
Medium

Vulnerability E
CVSS 4.0

Vulnerability F
CVSS 5.0

Attack feasibility
Very Low

… Logical component
… Logical path (a)

| | Risk-value variation | Priority |
|---|---|---|
| Vulnerability D | 0 | Low |
| Vulnerability E | +4 | High |
| Vulnerability F | 0 | Low |

(b)

10b
Assessment apparatus
11
Input unit
12
Path determiner
12a
Separation-settings identifier
12b
Path combiner
16
Use-status identifier
17
Score calculator
14
Output unit
D5
Vulnerability priority information
D1
Logical configuration information
D2
Threat analysis information
Device information
D4
Vulnerability assessment information

Figure 10:
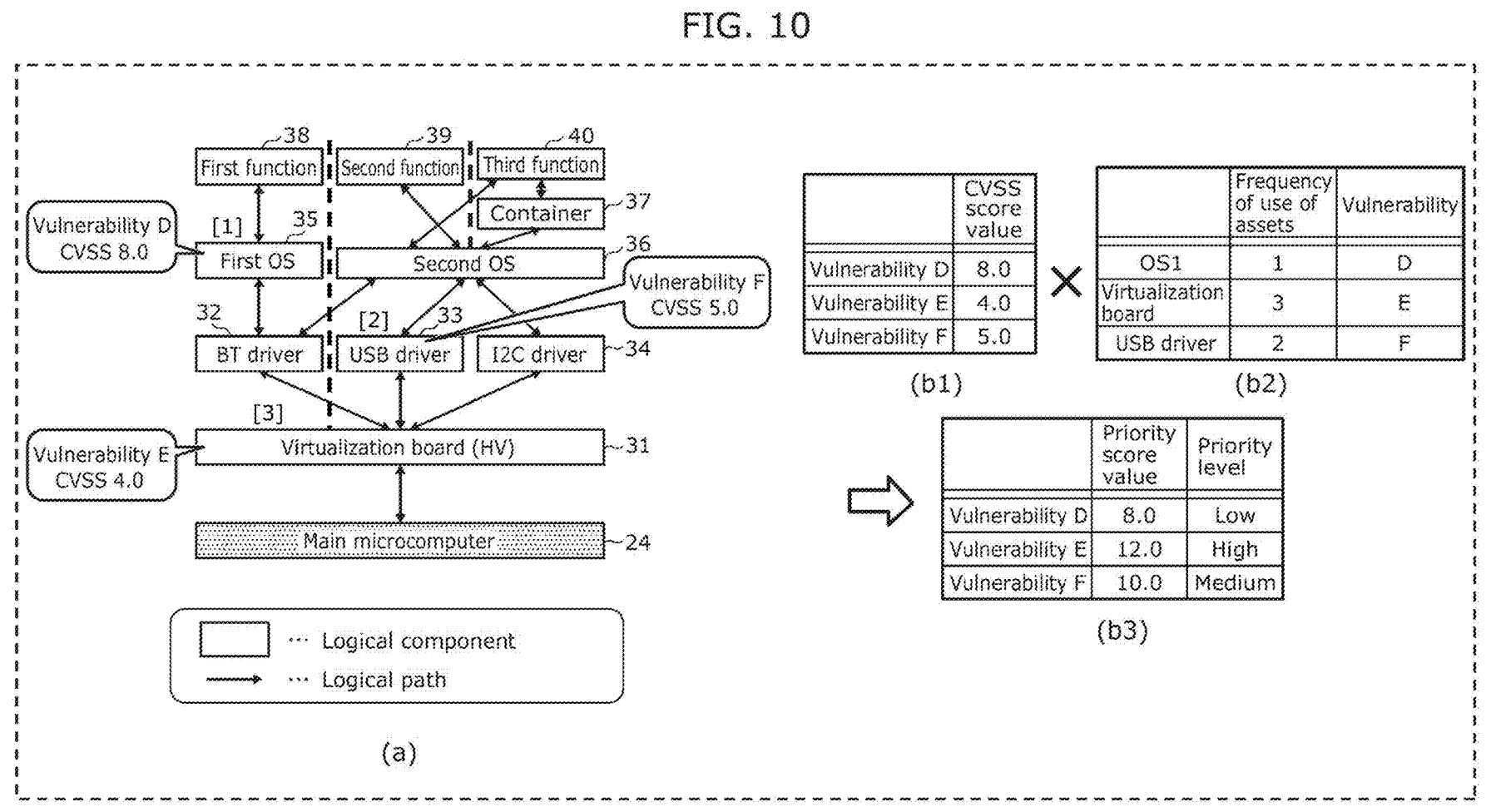

| | CVSS score value |
|---|---|
| Vulnerability D | 8.0 |
| Vulnerability E | 4.0 |
| Vulnerability F | 5.0 |

(b1)

×

| | Frequency of use of assets | Vulnerability |
|---|---|---|
| OS1 | 1 | D |
| Virtualization board | 3 | E |
| USB driver | 2 | F |

(b2)

| | Priority score value | Priority level |
|---|---|---|
| Vulnerability D | 8.0 | Low |
| Vulnerability E | 12.0 | High |
| Vulnerability F | 10.0 | Medium |

(b3)

ASSESSMENT APPARATUS AND ASSESSMENT METHOD

CROSS REFERENCE TO RELATED APPLICATION

The present application is based on and claims priority of Japanese Patent Application No. 2023-208864 filed on Dec. 11, 2023 and Japanese Patent Application No. 2024-131786 filed on Aug. 8, 2024.

FIELD

The present disclosure relates to an assessment apparatus or the like that assesses an assessment target device.

BACKGROUND

For example, Patent Literature (PTL) 1 discloses a security countermeasure support device. This security countermeasure support device appropriately determines whether security measures for information-processing equipment can be taken quantitatively. Specifically, the security countermeasure support device compares specification information and item/vulnerability information, the specification information representing one or more specification items of the information processing equipment, the item/vulnerability information representing one or more vulnerabilities of each of two or more specification items. Then, the security countermeasure support device determines the presence or absence of any vulnerability in accordance with the result of comparison for each of the one or more specification items of the information processing equipment. The security countermeasure support device further determines, for each of the one or more specification items that are determined to have a vulnerability, the presence or absence of urgency of the need to correct the vulnerability of the specification item and outputs the result of the determination. That is, the security countermeasure support device can also be said to be an assessment apparatus that assesses vulnerabilities of the information processing equipment.

CITATION LIST

Patent Literature

PTL 1: Japanese Unexamined Patent Application Publication No. 2022-100815

SUMMARY

However, the security countermeasure support device disclosed in PTL 1 described above can be improved upon.

In view of this, the present disclosure provides an assessment apparatus or the like capable of improving upon the above related art.

An assessment apparatus according to one aspect of the present disclosure is an assessment apparatus that assesses an assessment target device that includes a plurality of physical components for executing processing appropriate to a plurality of logical components, and includes an input device, a path determiner, and an assessment unit. The input device acquires device information about the assessment target device. The determine determines, based on the device information, a logical path including an array of one or more logical components and a physical path corresponding to the logical path and including an array of one or more physical components, the logical path and the physical path being paths of access to an asset of the assessment target device from an outside of the assessment target device, the asset being data or a function. The assessment unit assesses a risk value of the asset in accordance with an attack feasibility level and an influence level, the attack feasibility level indicating a level of attack feasibility on the physical path and the logical path that have been determined, the influence level indicating an influence to be exerted when the asset is invaded.

It is to be noted that such a generic or specific aspect of the present disclosure may be embodied as a system, a method, an integrated circuit, a computer program, or a computer-readable recording medium such as a CD-ROM, or may be embodied as any combination of a system, a method, an integrated circuit, a computer program, and a recording medium. The recording medium may be a non-transitory recording medium.

An assessment apparatus according to the present disclosure is capable of improving upon the above related art.

Further advantages and effects of one aspect of the present disclosure become apparent from the specification and the drawings. These advantages and/or effects are provided by configurations to be described in some embodiments and in the specification and drawings, but not necessarily all of the configurations are required.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 1 is a diagram for describing risk values assessed by a threat analysis device.

FIG. 7 is a diagram for describing the determination of priority according to Embodiment 2.

FIG. 10 is a diagram for describing the calculation of a priority score value according to Embodiment 3.

DESCRIPTION OF EMBODIMENTS

Figure 2:
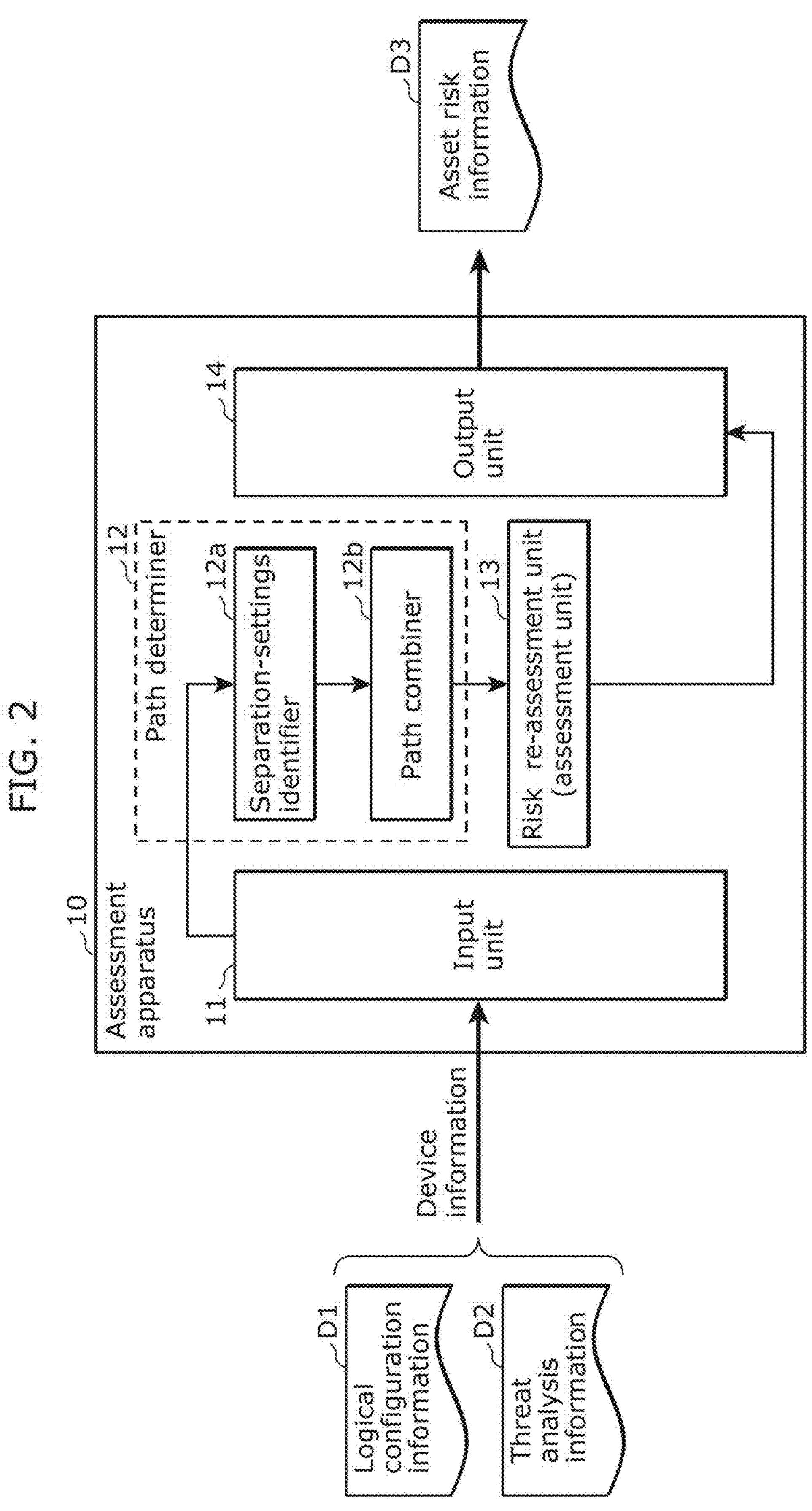
FIG. 2 is a block diagram showing one example of a configuration of an assessment apparatus according to Embodiment 1.

An assessment apparatus according to a first aspect of the present disclosure is an assessment apparatus according to one aspect of the present disclosure is an assessment apparatus that assesses an assessment target device that includes a plurality of physical components for executing processing appropriate to a plurality of logical components, and includes an input device, a path determiner, and an assessment unit. The input device acquires device information about the assessment target device. The determine determines, based on the device information, a logical path including an array of one or more logical components and a physical path corresponding to the logical path and including an array of one or more physical components, the logical path and the physical path being paths of access to an asset of the assessment target device from an outside of the assessment target device, the asset being data or a function. The assessment unit assesses a risk value of the asset in accordance with an attack feasibility level and an influence level, the attack feasibility level indicating a level of attack feasibility on the physical path and the logical path that have been determined, the influence level indicating an influence to be exerted when the asset is invaded.

In this way, the risk value of the asset is assessed in accordance with the physical path corresponding to the logical path. This improves the accuracy of assessment of the risk value and allows the safety of the assessment target device to be assessed with high accuracy. That is, the risk value assessed in accordance with only the physical path can be re-assessed with high accuracy. As a result, the assessment apparatus according to the first aspect of the present disclosure is capable of assessing the safety of the assessment target device with high accuracy, unlike the aforementioned security countermeasure support device disclosed in PTL 1 that is incapable of accurately assessing the safety of the information processing equipment serving as an assessment target device.

In an assessment apparatus according to a second aspect, the path determiner may include a separation-settings identifier that identifies a separation state that is set for the plurality of logical components and a path combiner that combines the physical path and the logical path by determining the logical path in accordance with the separation state identified and determining the physical path corresponding to the logical path. The assessment unit may assess the risk value of the asset in accordance with the physical path and the logical path that have been combined. Note that the second aspect may depend on the first aspect.

In this way, the logical path is determined in accordance with the separation state set for the plurality of logical components. This makes it possible to determine an appropriate logical path and to assess the risk value of the asset with higher accuracy.

In an assessment apparatus according to a third aspect, the input unit may further acquire vulnerability assessment information that indicates one or more vulnerabilities of one or more logical components among the plurality of logical components, the path determiner may further re-determine the physical path and the logical path in accordance with the vulnerability for each of the one or more vulnerabilities of the one or more logical components indicated by the vulnerability assessment information, the processor further, and the assessment unit may further re-assess the risk value of the asset in accordance with the physical path and the logical path that have been re-determined, for each of the one or more vulnerabilities of the one or more logical components. The assessment apparatus may further include a priority determiner that determines, for each of the vulnerability of at least one logical component, a priority of mitigation to be taken against the vulnerability in accordance with the risk value of the asset re-assessed. Note that the third aspect may depend on the first or second aspect.

In this way, for each vulnerability, the risk value of the asset is re-assessed in accordance with the logical path corresponding to the vulnerability, and the priority of mitigation to be taken against the vulnerability is determined in accordance with the re-assessed risk value. Accordingly, it is possible to derive an appropriate priority for the vulnerability and to improve the safety of the assessment target device by taking mitigation appropriate to the priority.

In an assessment apparatus according to a fourth aspect, the assessment target device includes a plurality of assets including the asset. For each of the plurality of assets, (a) the path determiner may re-determine the physical path and the logical path that lead to the asset, and (b) the assessment unit may re-assess the risk value of the asset in accordance with the physical path and the logical path that have been re-determined, and, and the priority determiner may determine, for each of the one or more vulnerabilities of the one or more logical components, the priority for the vulnerability in accordance with the risk values of the plurality of assets re-assessed. Note that the fourth aspect may depend on the third aspect.

In this way, the priority of the mitigation to be taken against the vulnerability is determined in accordance with the re-assessed risk values of the plurality of assets. Accordingly, it is possible to derive an appropriate priority from the viewpoint of the plurality of assets and to effectively improve the safety of the assessment target device by taking mitigation appropriate to the priority.

In an assessment apparatus according to a fifth aspect, the priority determiner may determine, for each of the one or more vulnerabilities of the one or more logical components, the priority for the vulnerability in accordance with (a) a total of the risk values of the plurality of assets re-assessed, (b) a total number of risk values that indicates a predetermined maximum value among the risk values of the plurality of assets re-assessed, or (c) a total of amounts of change in the risk values of the plurality of assets re-assessed. Note that the fifth aspect may depend on the fourth aspect.

Accordingly, it is possible to derive an appropriate priority according to the purpose.

In an assessment apparatus according to a sixth aspect, the input unit may further acquire vulnerability assessment information that indicates, as a score value, a vulnerability of at least one logical component among the plurality of logical components. The assessment target device may include a plurality of assets including the asset, and the path determiner may further determine the logical path for each of the plurality of assets. The assessment apparatus may further include a score calculator that, for each of the one or more vulnerabilities of the one or more logical components indicated by the vulnerability assessment information, the processor further assesses a priority of mitigation to be taken against the vulnerability as a priority score value in accordance with the score value of the vulnerability and a use status of a logical component corresponding to the vulnerability, being used by the plurality of assets. Note that the sixth aspect may depend on any one of the first to fifth aspects.

This allows the priority to be derived as a priority score value without using the risk value of the asset and thereby improves the degree of flexibility in deriving the priority.

An assessment apparatus according to a seventh aspect may further include a usage-status identifier that identifies the use status of the logical component corresponding to the vulnerability, being used by the plurality of assets, as a total number of assets using the logical component. The score calculator may calculate the priority score value by multiplying the score value and the total number of assets together. Note that the seventh aspect may depend on the sixth aspect.

In this way, a higher priority (i.e., priority score value) is derived for each vulnerability with increasing number of assets that use the logical component corresponding to the vulnerability. Thus, it is possible to derive an appropriate priority.

An assessment apparatus according to an eighth aspect is an assessment apparatus that that assesses an assessment target that executes processing appropriate to a plurality of logical components, and includes an input unit that acquire configuration information about the assessment target, a path determiner that determine a logical path including an array of one or more logical components in accordance with the configuration information, the logical path being a path of access to an asset of the assessment target from an outside of the assessment target, the asset being data or a function, and an assessment unit that assesses a risk value of the asset in accordance with an attack feasibility level and an influence level, the attack feasibility level indicating a level of attack feasibility on the logical path determined, the influence level indicating an influence to be exerted when the asset is invaded In this way, the risk value in accordance with the logical path can be derived even if the physical path is unknown. The derived risk value may be combined later with the physical path in order to re-assess the risk. Thus, it is possible to expect the effect that the period of risk re-assessment can be shortened in derivative expansion to other physical configurations.

Embodiments will be described hereinafter in detail with reference to the drawings.

Note that each embodiment described below illustrates a generic or specific example of the present disclosure. Thus, numerical values, shapes, materials, constituent elements, arrangement positions and connection forms of constituent elements, steps, a sequence of steps, and so on in the following embodiments are mere examples and do not intend to limit the scope of the present disclosure. Among the constituent elements described in the following embodiments, those that are not recited in any independent claim that represents the broadest concept are described as optional constituent elements.

Each drawing is a schematic diagram and does not necessarily provide precise depiction. Throughout the drawings, the same constituent elements are given the same reference signs.

Embodiment 1

An assessment apparatus according to the present embodiment re-assesses risk values of assets of an assessment target device. That is, the assessment apparatus according to the present embodiment assesses again the risk values of assets that have been assessed by a threat analysis device in the stage of development of the assessment target device. The processing for assessing the risk values can also be said to be processing for deriving the risk values, and the processing for re-assessing the risk values can also be said to be processing for re-deriving the risk values. The assessment of the risk values by the threat analysis device will be described hereinafter and then followed by a description of the assessment apparatus according to the present embodiment.

FIG. 1 is a diagram for describing the risk values to be assessed by the threat analysis device.

For example, the threat analysis device assesses the risk values of assets A, B, and C of assessment target device 20 as shown in (a) in FIG. 1. For example, assets A, B, and C may be data or functions of assessment target device 20 that are to be protected. Assessment target device 20 may be configured as, for example, an electronic control unit (ECU) mounted on a vehicle and communicate external devices such as smartphone 91 and Diag 92 via a wire or wirelessly. Smartphone 91 is a smartphone, and Diag 92 is a device for diagnosing defects such as imperfections or malfunctions in a vehicle. Assessment target device 20 includes physical components including BT interface 21, USB interface 22, CAN interface 23, Main microcomputer 24, and CAN microcomputer 25. BT interface 21 is an interface for Bluetooth (registered trademark) and also labeled BT I/F. USB interface 22 is an interface for a universal serial bus (USB) and also labeled USB I/F. CAN interface 23 is an interface for a controller area network (CAN) and also labeled CAN I/F. Main microcomputer 24 is a microcomputer that controls assessment target device 20. Main microcomputer 24 includes assets A, B, and C described above. CAN microcomputer 25 is a microcomputer that controls the CAN of assessment target device 20. Note that the physical components are hardware components.

Here, a physical path exists between each of Main microcomputer 24, BT interface 21, USB interface 22, and CAN microcomputer 25. A physical path also exists between BT interface 21 and smartphone 91. Physical paths also exist between CAN microcomputer 25 and CAN interface 23 and between CAN interface 23 and Diag 92. Note that the physical paths are physical connection paths.

Each physical component may have an attachability level assigned thereto. For example, BT interface 21 has an attack feasibility level of "Medium" assigned thereto. USB interface 22 has an attack feasibility level of "Very Low" assigned thereto.

Each asset may have an influence level set thereto, the influence level indicating an influence to be exerted on assessment target device 20 when the asset is attacked. For example, an influence level of "Moderate" is set to asset A, an influence level of "Severe" is set to asset B, and an influence level of "Major" is set to asset C.

The threat analysis device determines an attack path leading to each of assets A, B, and C. That is, the threat analysis device determines a physical path including an array of one or more physical components for each of asset A, B, and C, the physical path being a path leading to the asset from an external device. The physical path is hereinafter also referred to as the physical path leading to the asset.

For example, in the case of attacking assets A, B, and C, smartphone 91 may access Main microcomputer 24 via BT interface 21 that has an attack feasibility level of "Medium" assigned thereto. Alternatively, smartphone 91 may access Main microcomputer 24 via USB interface 22 that has an attack feasibility level of "Very Low" assigned thereto. In this case, the threat analysis device determines an attack path that passes through a physical component with a highest attack feasibility level assigned thereto. In the case of the aforementioned example, the highest attack feasibility level is "Medium". Thus, the threat analysis device determines, as the attack path, a physical path that leads from smartphone 91 via BT interface 21 to Main microcomputer 24.

The threat analysis device assesses the risk value of each asset by deriving the risk value through use of the attack feasibility level of "Medium" and the influence level of the asset with reference to a risk matrix table shown in (b) in FIG. 1.

As shown in (b) in FIG. 1, the risk matrix table shows the risk value corresponding to each combination of the attack feasibility level and the influence level. The attack feasibility level is classified into Very Low, Low, Medium, and High. These levels are ranked in ascending order. The influence level is classified into Severe, Major, Moderate, and Negligible. These levels are ranked in descending order.

In the aforementioned example, asset A has an influence level of "Moderate", asset B has an influence level of "Severe", and asset C has an influence level of "Major". The attack feasibility levels for the attack paths leading to the assets are "Medium". That is, the highest attack feasibility level on the attack paths, i.e., on the physical paths leading to the assets, is "Medium". Therefore, risk re-assessment unit 13 derives "2" as a risk value of asset A, "4" as a risk value of asset B, and "3" as a risk value of asset C with reference to the risk matrix table. Then, the risk values of assets A, B, and C are assessed. Note that the influence level, the attack feasibility level, and the risk matrix table may be defined by, for example, the International Organization for Standardization (ISO) 21434.

Assessment apparatus 10 according to the present embodiment re-assesses the risk values assessed as described above.

FIG. 2 is a block diagram showing one example of a configuration of the assessment apparatus according to the present embodiment.

Assessment apparatus 10 according to the present embodiment is an apparatus that assesses the safety of assessment target device 20 that includes a plurality of physical components for executing processing appropriate to a plurality of logical components, and re-assesses the risk values of assets assessed by the threat analysis device as described above. Assessment apparatus 10 includes input unit 11, path determiner 12, risk re-assessment unit 13, and output unit 14.

Input unit 11 acquires logical configuration information D1 and threat analysis information D2 that form device information about assessment target device 20. Logical configuration information D1 indicates a logical configuration of assessment target device 20. The logical configuration can also be said to be a software configuration. Logical configuration information D1 may indicate a software parts table, i.e., software bills of materials (SBOM). Threat analysis information D2 may indicate, for example, the risk value of each asset assessed by the threat analysis device, the influence level of each asset, and one or more attack paths. Note that the attack paths may represent the physical paths leading to the assets and the attack feasibility levels for the physical paths.

Path determiner 12 determines a physical path and a logical path. That is, path determiner 12 determines, based on the device information, a logical path including an array of one or more logical components and a physical path corresponding to the logical path and including an array of one or more physical components, the logical path and the physical path being paths of access to an asset of assessment target device 20 from the outside of assessment target device 20, the asset being data or a function. Note that the logical components may, for example, be software. The logical path is also called a logical path leading to an asset, and the physical path corresponding to the logical path is also called a physical path leading to the aforementioned asset. Path determiner 12 includes separation-settings identifier 12*a* and path combiner 12*b*. Separation-settings identifier 12*a* identifies a separation state that is set for the logical configuration of assessment target device 20, i.e., a separation state that is set for the plurality of logical components. Path combiner 12*b* combines the physical path and the logical path by determining the logical path in accordance with the identified separation state and determining the physical path corresponding to the logical path.

Risk re-assessment unit 13 assesses the risk value of each asset in accordance with the physical path and the logical path that have been combined by path combiner 12*b*. That is, risk re-assessment unit 13 assesses the risk value of the asset in accordance with the attack feasibility level determined for the physical path and the logical path by path combiner 12*b* and the influence level to be exerted when the asset is invaded. In the present embodiment, since the risk of each asset has been assessed by the threat analysis device, risk re-assessment unit 13 re-assesses the risk value of the asset assessed by the threat analysis device. If the risk of the asset has not been assessed by the threat analysis device, i.e., if threat analysis information D2 does not indicate the risk value of the asset, risk re-assessment unit 13 may assess the risk value, instead of re-assessing the risk value. In this case, risk re-assessment unit 13 may be referred to as an assessment unit.

Output unit 14 generates information about the risk value of each asset assessed or re-assessed by risk re-assessment unit 13 as asset risk information D3 and outputs asset risk information D3 to the outside of assessment apparatus 10.

Figure 3:
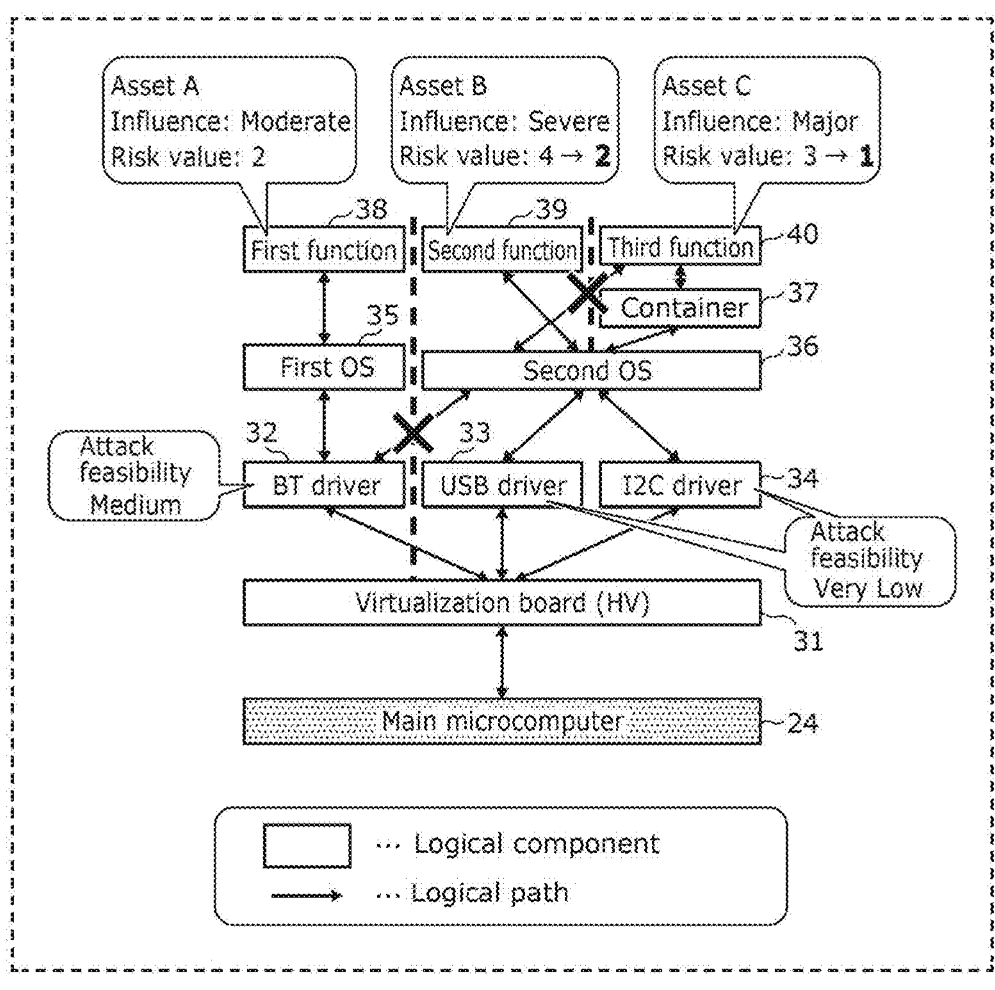
FIG. 3 is a diagram for describing a processing operation of a path determiner according to Embodiment 1.

FIG. 3 is a diagram for describing the processing operation of path determiner 12 according to the present embodiment.

Main microcomputer 24 includes a plurality of logical components. For example, Main microcomputer 24 may include virtualization board 31, BT driver 32, USB driver 33, I2C driver 34, first OS 35, second OS 36, container 37, first function 38, second function 39, and third function 40 as a plurality of logical components as shown in FIG. 3.

Virtualization board 31 is a hypervisor (also called HV) mounted on the ECU. BT driver 32 is a driver for controlling or operating BT interface 21. USB driver 33 is a driver for controlling or operating USB interface 22. I2C driver 34 is a driver for controlling or operating a communication interface of an inter-integrated circuit (I2C). First OS 35 and second OS 36 are operation systems. Container 37 may be a container used in, for example, Docker. First function 38 includes asset A, second function 39 includes asset B, and third function 40 includes asset C.

A logical path exists between each of virtualization board 31, BT driver 32, USB driver 33, and I2C driver 34. Logical paths also exist between BT driver 32 and first OS 35 and between first OS 35 and first function 38. A logical path also exists between each of second OS 36, USB driver 33, I2C driver 34, container 37, second function 39, and third function 40. A logical path also exists between container 37 and third function 40.

Here, virtualization board 31 and container 37 each include a memory separation mechanism. The memory separation mechanism is also simply referred to as a separation mechanism. The separation mechanism of virtualization board 31 separates BT driver 32, first OS 35, and first function 38 from USB driver 33, I2C driver 34, second OS 36, container 37, second function 39, and third function 40 and interrupts the logical paths therebetween. That is, the logical path between BT driver 32 and second OS 36 is interrupted. Accordingly, this logical path is regarded as not existing. The separation mechanism of container 37 interrupts the logical path between second OS 36 and third function 40. Thus, this logical path is regarded as not existing. Such a separation mechanism for isolating logical components sets a separation state for the logical components included in assessment target device 20.

Logical configuration information D1 acquired by input unit 11 indicates a plurality of logical components included in Main microcomputer 24, logical paths between each of the logical components, and a separation mechanism set for one or more logical components among the logical components.

Threat analysis information D2 acquired by input unit 11 indicates, for each of assets A, B, and C of assessment target device 20, the influence level of the asset and one or more attack paths leading to the asset.

When threat analysis information D2 indicates a plurality of attack paths for each of assets A, B, and C, path determiner 12 extracts one or more attack paths from the plurality of attack paths in accordance with logical configuration information D1 and determines the one or more attack paths as attack paths to be assessed. That is, for each of assets A, B, and C, path determiner 12 determines the physical path leading to the asset in accordance with logical configuration information D1. For example, path determiner 12 may determine a physical path leading from smartphone 91 via BT interface 21 to asset A of Main microcomputer 24. Specifically, the processing proceeds as follows.

Separation-settings identifier 12*a* identifies the above separation state that is set for the plurality of logical components included in Main microcomputer 24, in accordance with the separation mechanism indicated by logical configuration information D1. Path combiner 12*b* determines the logical path of access to each asset from the outside of Main microcomputer 24 in accordance with the identified separation state. That is, path combiner 12*b* determines the logical path leading from virtualization board 31 to each of assets A, B, and C. For example, path combiner 12*b* may determine a path that leads from virtualization board 31 via BT driver 32 and first OS 35 to first function 38 as the logical path leading to asset A.

Meanwhile, path combiner 12*b* assumes on the basis of the aforementioned separation state that there is no logical path between BT driver 32 and second OS 36. As a result, path combiner 12*b* determine a path that leads from virtualization board 31 via USB driver 33 or second OS 36 and via I2C driver 34 to second function 39 as the logical path leading to asset B. Similarly, path combiner 12*b* assumes on the basis of the aforementioned separation state that there is no logical path between second OS 36 and third function 40. As a result, path combiner 12*b* determines a path that leads from virtualization board 31 via USB driver 33 or I2C driver 34 and via second OS 36 and container 37 to third function 40 as the logical path leading to asset C.

Path combiner 12*b* further combines the physical path and the logical path for each of assets A, B, and C by determining the physical path corresponding to the determined logical path.

Figure 4:
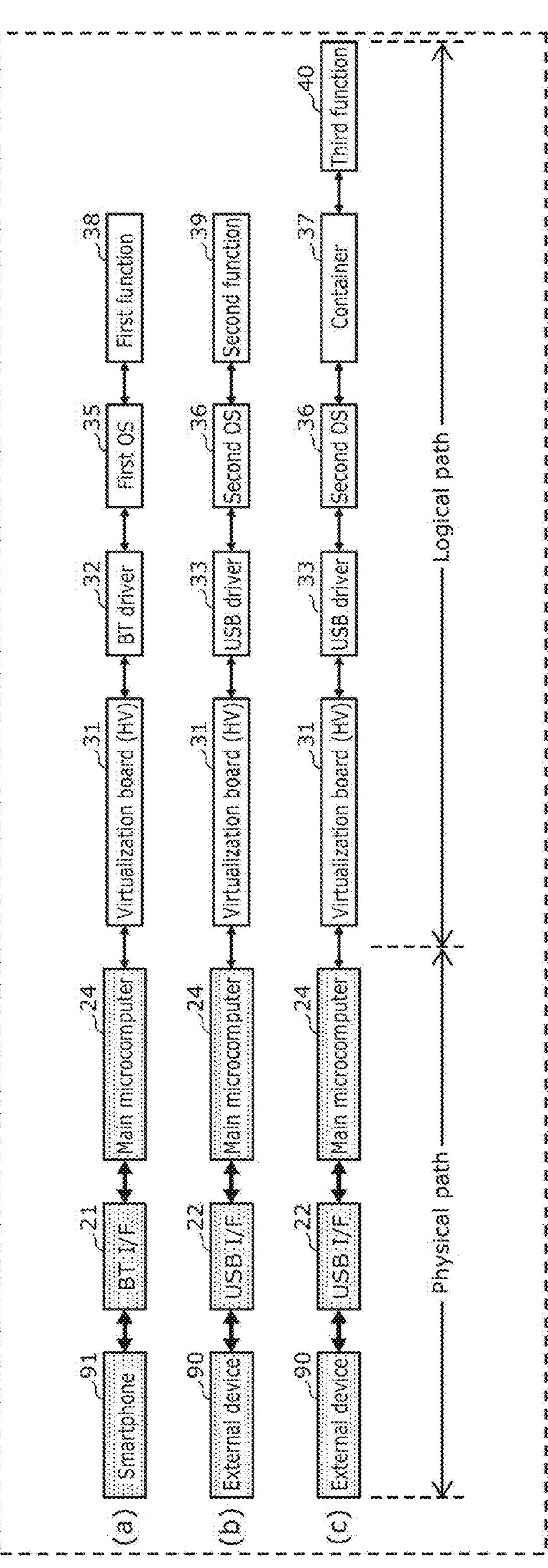
FIG. 4 is a diagram showing one example of a combined path of physical and logical paths according to Embodiment 1.

FIG. 4 is a diagram showing one example of combined paths of physical and logical paths.

For example, path combiner 12*b* extracts an attack path that corresponds to the logical path leading to asset A from among a plurality of attack paths that lead to asset A and that are indicated by threat analysis information D2. As described above, the logical path leading to asset A is a path that leads from virtualization board 31 via BT driver 32 and first OS 35 to first function 38. Thus, path combiner 12*b* extracts, as the attack path corresponding to the logical path leading to asset A, an attack path that indicates a physical path leading from smartphone 91 via BT interface 21 to asset A of Main microcomputer 24 from among the attack paths that lead to asset A and that are indicated by threat analysis information D2. In this way, the physical path corresponding to the logical path leading to asset A is determined. That is, the physical path that passes through "smartphone 91, BT interface 21, and Main microcomputer 24" plus the logical path that passes through "virtualization board 31, BT driver 32, first OS 35, and first function 38" as shown in (a) in FIG. 4 are determined as the path leading to asset A. In this way, the physical path and the logical path that lead to asset A are combined together.

Similarly, for example, path combiner 12*b* extracts an attack path that corresponds to the logical path leading to asset B from among a plurality of attack paths that lead to asset B and that are indicated by threat analysis information D2. As described above, the logical path leading to asset B is a path that leads from virtualization board 31 via USB driver 33 or I2C driver 34 and via second OS 36 to second function 39. Thus, path combiner 12*b* determines, as the attack path corresponding to the logical path leading to asset B, an attack path that indicates a physical path leading from external device 90 via USB interface 22 to asset B of Main microcomputer 24 from among the attack paths that lead to asset B and that are indicated by threat analysis information D2. In this way, the physical path corresponding to the logical path leading to asset B is determined. As a result, the attack path determined by the threat analysis device, i.e., the physical path leading from smartphone 91 via BT interface 21 to Main microcomputer 24, is not determined as the physical path to be assessed by assessment apparatus 10. That is, the physical path that passes through "external device 90, USB interface 22, and Main microcomputer 24" plus the logical path that passes through "virtualization board 31, USB driver 33, second OS 36, and second function 39" are determined as the path leading to asset B. In this way, the physical path and the logical path that lead to asset B are combined together.

Similarly, path combiner 12*b* extracts an attack path that corresponds to the logical path leading to asset C from among a plurality of attack paths that lead to asset C and that are indicated by threat analysis information D2. As described above, the logical path leading to asset C is a path that leads from virtualization board 31 via USB driver 33 or I2C driver 34 and via second OS 36 and container 37 to third function 40. Thus, path combiner 12*b* determines, as the attack path corresponding to the logical path leading to asset C, an attack path that indicates a physical path leading from external device 90 via USB interface 22 to asset C of Main microcomputer 24 from among the attack paths that lead to asset C and that are indicated by threat analysis information D2. In this way, the physical path corresponding to the logical path leading to asset C is determined. As a result, the attack path determined by the threat analysis device, i.e., the physical path leading from smartphone 91 via BT interface 21 to Main microcomputer 24, is not determined as the physical path to be assessed by assessment apparatus 10. That is, the physical path that passes through "external device 90, USB interface 22, and Main microcomputer 24" plus the logical path that passes through "virtualization board 31, USB driver 33, second OS 36, container 37, and third function 40" are determined as the path leading to asset C. In this way, the physical path and the logical path that lead to asset C are combined together.

Risk re-assessment unit 13 identifies, for each of assets A, B, and C, a highest level from among attack feasibility levels assigned to one or more physical components on the physical path determined for the asset, in accordance with threat analysis information D2. Then, with reference to the risk matrix table shown in (b) in FIG. 2, risk re-assessment unit 13 derives the risk value of the asset by using the attack feasibility level identified as the highest level and the influence level of the asset. In this way, the risk value is re-assessed.

For example, risk re-assessment unit 13 identifies the attack feasibility level of "Medium" for BT interface 21 as a highest level on the physical path leading to asset A. Then, risk re-assessment unit 13 derives, as the risk value of asset A, a risk value of "2" that is associated with a combination of the attack feasibility level of "Medium" and the influence level of "Moderate" for asset A in the risk matrix table shown in (b) in FIG. 2. In this way, the risk value of asset A is re-assessed. That is, as shown in FIG. 3, the risk value of "2" of asset A assessed by the threat analysis device is also re-assessed as "2" by assessment apparatus 10.

Similarly, risk re-assessment unit 13 identifies the attack feasibility level of "Very Low" for USB interface 22 as a highest level on the physical path leading to asset B. Then, risk re-assessment unit 13 derives, as the risk value of asset B, a risk value of "2" that is associated with a combination of the attack feasibility level of "Very Low" and the influence level of "Severe" for asset B in the risk matrix table shown in (b) in FIG. 2. In this way, the risk value of asset B is re-assessed. That is, as shown in FIG. 3, the risk value of "4" of asset B assessed by the threat analysis device is re-assessed as "2" by assessment apparatus 10.

Similarly, risk re-assessment unit 13 identifies the attack feasibility level of "Very Low" for USB interface 22 as a highest level on the physical path leading to asset C. Then, risk re-assessment unit 13 derives, as the risk value of asset C, a risk value of "1" that is associated with a combination of the attack feasibility level of "Very Low" and the influence level of "Major" for asset C in the risk matrix table shown in (b) in FIG. 2. In this way, the risk value of asset C is re-assessed. That is, as shown in FIG. 3, the risk value of "3" of asset C assessed by the threat analysis device is re-assessed as "1" by assessment apparatus 10.

Figure 5:
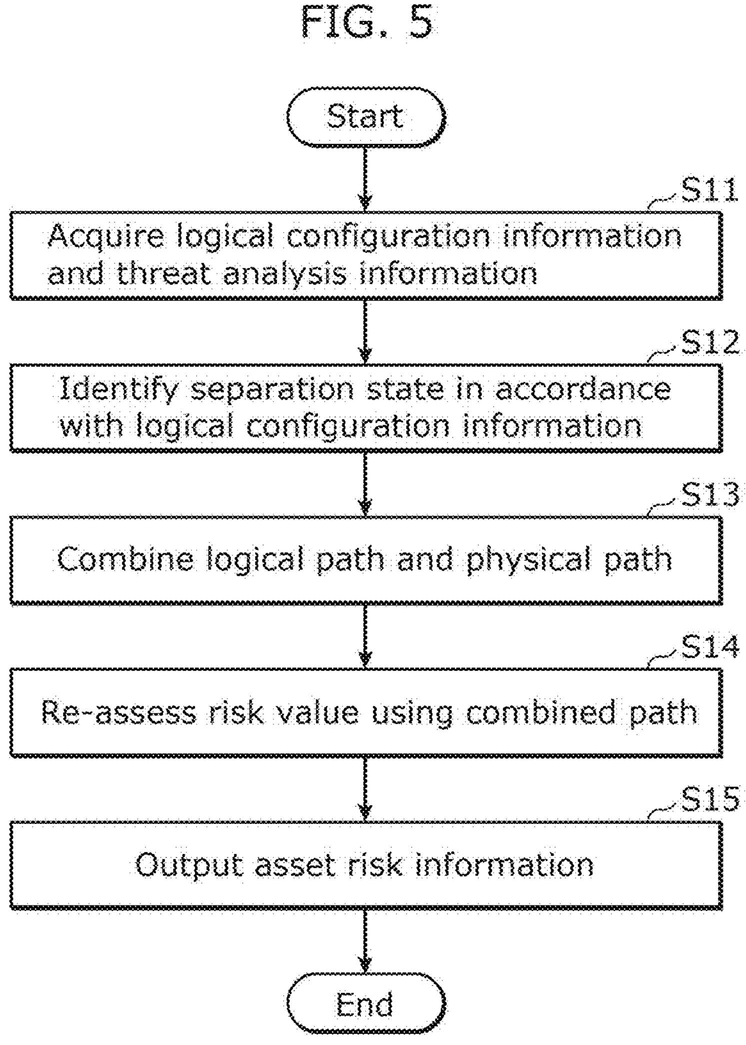
FIG. 5 is a flowchart showing one example of processing operations of the assessment apparatus according to Embodiment 1.

FIG. 5 is a flowchart showing one example of the processing operations of assessment apparatus 10.

First, input unit 11 of assessment apparatus 10 acquires logical configuration information D1 and threat analysis information D2 as the device information (step S11). Then, separation-settings identifier 12*a* identifies a separation state that is set for the plurality of logical components included in assessment target device 20, in accordance with logical configuration information D1 (step S12).

Then, for each asset, path combiner 12*b* combines the logical path and the physical path corresponding to the logical path in accordance with the separation state (step S13). Risk re-assessment unit 13 re-assesses, for each asset, the risk value of the asset by using the combined path of the logical path and the physical path (step S14). Then, output unit 14 generates and outputs asset risk information D3 that indicates the re-assessed risk value of each asset (step S15). Note that asset risk information D3 may indicate not only the re-assessed risk value of each asset but also the risk value of each asset before re-assessment. The risk values before re-assessment correspond to the risk values indicated by threat analysis information D2.

In this way, according to the present embodiment, the risk value of each asset is assessed in accordance with the physical path corresponding to the logical path. This improves the accuracy of assessment of the risk values and allows the safety of assessment target device 20 to be assessed with high accuracy. That is, the risk value assessed in accordance with only the physical path can be re-assessed with high accuracy. Since the logical path is determined in accordance with the separation state set for the plurality of logical components, it is possible to determine a more appropriate logical path and to further improve the accuracy of assessment of the risk value of each asset.

Although the ECU serves as assessment target device 20 in the aforementioned example, assessment target device 20 is not limited to the ECU and may be any other device. Assessment target device 20 may also be a vehicle or a system provided with the ECU. In this case, Main microcomputer 24 described above may serve as an ECU or a server. In this case, it is possible to re-assess the risk value in accordance with the logical path and the separation mechanism of the ECU.

The separation state set for the plurality of logical components is not limited to the state in which the logical components are separated into two or more element groups, but may also be a multistage separation state in which the above element groups are further separated into sub-element groups. For example, the logical components may be separated into two or more element groups by virtualization board 31, and a plurality of logical components included in one of the above element groups may be separated into two or more sub-element groups by the container.

In the case where software such as open source software (OSS) has a vulnerability that is difficult to cope with, the logical path may be switched to another alternate logical path in order to reduce the risk value.

Embodiment 2

Figure 6:
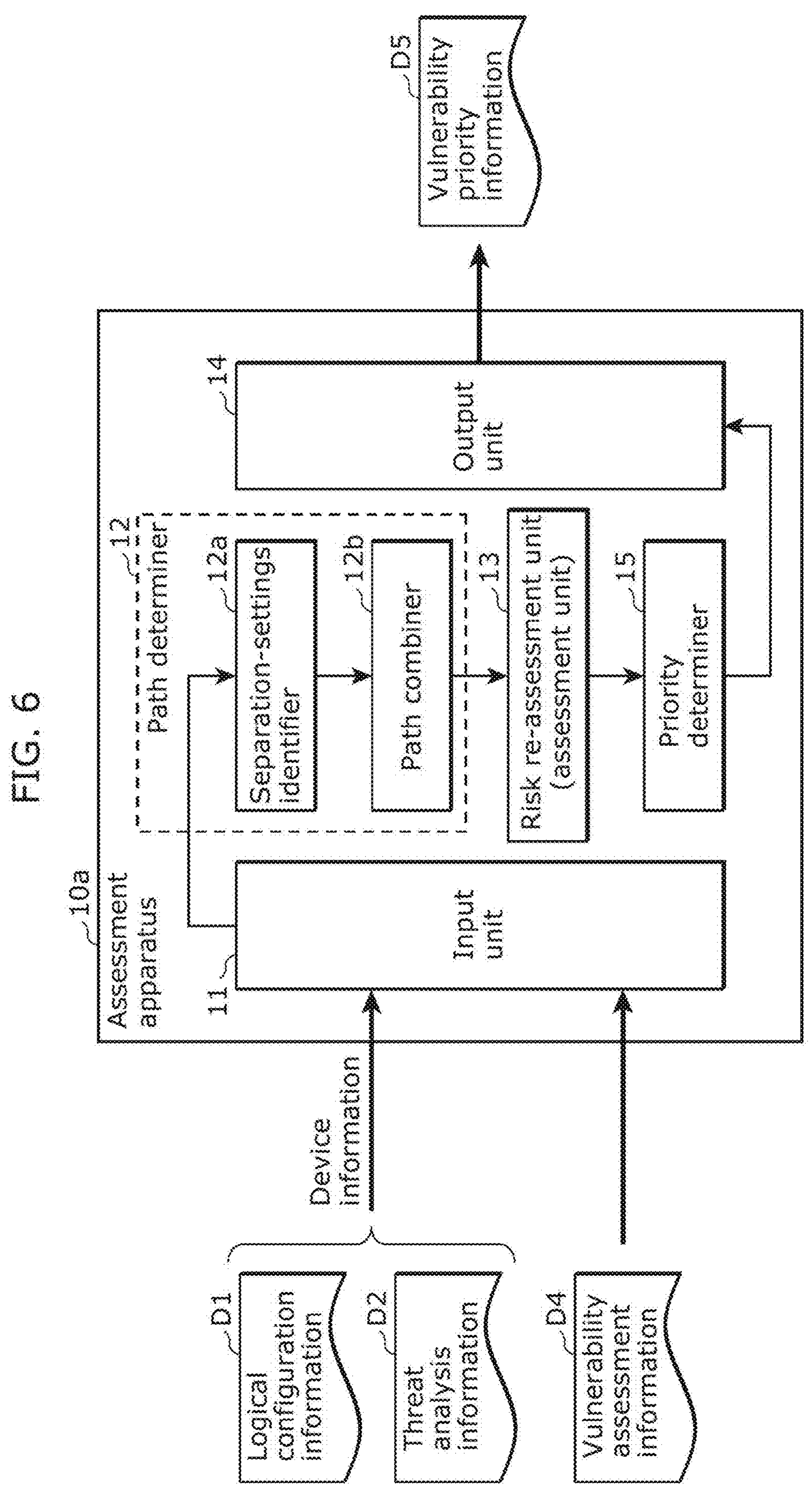
FIG. 6 is a block diagram showing one example of a configuration of an assessment apparatus according to Embodiment 2.

FIG. 6 is a block diagram showing one example of a configuration of an assessment apparatus according to the present embodiment.

Assessment apparatus 10*a* according to the present embodiment includes the constituent elements of assessment apparatus 10 according to Embodiment 1 and further includes priority determiner 15. Input unit 11 according to the present embodiment acquires not only logical configuration information D1 and threat analysis information D2 but also vulnerability assessment information D4. Vulnerability assessment information D4 indicates a vulnerability of at least one logical component among the plurality of logical components included in assessment target device 20.

Assessment apparatus 10*a* according to the present embodiment firstly re-assesses the risk value of an asset by performing processing operations similar to those performed by assessment apparatus 10 according to Embodiment 1 in, for example, the stage of shipping and operating assessment target device 20. Through this re-assessment, assessment apparatus 10*a* assesses again the risk values assessed by the threat analysis device. Then, when vulnerability assessment information D4 is input to input unit 11, assessment apparatus 10*a* according to the present embodiment re-assesses again the risk value of each asset. Through this re-re-assessment, assessment apparatus 10*a* assesses again the risk values assessed in the development stage in accordance with vulnerability assessment information D4. That is, if the risk value of the asset has been assessed in the development stage by the threat analysis device, the assessment and the re-assessment performed by assessment apparatus 10*a* correspond respectively to re-assessment and re-re-assessment.

Specifically, when input unit 11 has acquired vulnerability assessment information D4, path determiner 12 according to the present embodiment re-determines, for each of the vulnerability of at least one logical component indicated by vulnerability assessment information D4, the physical path and the logical path that lead to the asset in accordance with the vulnerability. Then, for each of the vulnerability of at least one logical component, risk re-assessment unit 13 re-assesses the risk value of the asset in accordance with the physical path and the logical path that have been re-determined.

Priority determiner 15 determines, for each of the vulnerability of at least one logical component indicated by vulnerability assessment information D4, a priority of mitigation to be taken against the vulnerability in accordance with the re-assessed risk value of the asset, i.e., the re-reassessed risk value of the asset. That is, priority determiner 15 determines the priority for the vulnerability. Output unit 14 generates vulnerability priority information D5 and outputs vulnerability priority information D5 to the outside of assessment apparatus 10*a*, the vulnerability priority information being information about the priority determined for each of the vulnerability of at least one logical component indicated by vulnerability assessment information D4.

In the case where assessment target device 20 includes a plurality of assets, risk re-assessment unit 13 re-assesses the risk value of each asset. Then, priority determiner 15 determines the priority of mitigation to be taken against each vulnerability in accordance with the re-assessed risk values of the assets. That is, for each of the assets, path determiner 12 re-determines the physical path and the logical path that lead to the asset, and risk re-assessment unit 13 re-assesses the risk value of the asset in accordance with the physical path and the logical path that have been re-determined. Note that the physical path and the logical path are the physical path and the logical path that lead to the asset. Then, for each of the vulnerability of at least one logical component, priority determiner 15 determines the priority for the vulnerability in accordance with the re-assessed risk values of the assets.

FIG. 7 is a diagram for describing the determination of the priority.

For example, vulnerability assessment information D4 indicates a vulnerability D of first OS 35, which is a logical component, as shown in (a) in FIG. 7. Specifically, vulnerability D is indicated as the degree of seriousness of the vulnerability and more specifically as a value in a common vulnerability scoring system (CVSS) (i.e., as a CVSS score value). Note that vulnerability assessment information D4 may indicate the CVSS score value for each CVE identification number in common vulnerabilities and exposures (CVE). Separation-settings identifier 12*a* of path determiner 12 identifies a separation state for the case where the information indicates vulnerability D of first OS 35. In this case, separation-settings identifier 12*a* identifies the same separation state as the separation state identified for the case where the information does not indicate vulnerability D of first OS 35. That is, separation-settings identifier 12*a* identifies the same separation state as the separation state identified at the time of assessing the risk value. As a result, path determiner 12 determines the logical path and the physical path that are the same as those determined at the time of assessing the risk values of assets A, B, and C. Accordingly, risk re-assessment unit 13 derives the same risk value as the risk value derived at the time of assessing each of assets A, B, and C. In this way, the risk values of assets A, B, and C are re-assessed.

In this case, since the amounts of change in the risk values of assets A, B, and C are zero, priority determiner 15 calculates a risk-value variation of "0" as a total sum of the amounts of change as shown in (b) in FIG. 7. As a result, priority determiner 15 determines "Low" as the priority of vulnerability D.

Similarly, vulnerability assessment information D4 indicates vulnerability E of virtualization board 31, which is a logical component, as shown in (a) in FIG. 7. Separation-settings identifier 12*a* of path determiner 12 identifies a separation state for the case where the information indicates vulnerability E of virtualization board 31. In this case, separation-settings identifier 12*a* identifies a separation state different from the separation state identified for the case where the information does not indicate vulnerability E of virtualization board 31. That is, separation-settings identifier 12*a* determines that the separation mechanism of virtualization board 31 does not exist and only the separation mechanism of container 37 exists. As a result, separation-settings identifier 12*a* identifies a separation state in which a logical path exists between BT driver 32 and second OS 36 and in which the logical path between second OS 36 and third function 40 is interrupted. In other words, separation-settings identifier 12*a* identifies a separation state in which BT driver 32, first OS 35, and first function 38 are not separated from USB driver 33, I2C driver 34, second OS 36, container 37, second function 39, and third function 40 and in which second OS 36 is separated from third function 40.

As a result, path determiner 12 determines, for asset A, the logical path and the physical path that are the same as the logical path and the physical path determined at the time of assessing the risk value and determines, for each of assets B and C, the logical path and the physical path that are different from the logical path ad the physical path determined at the time of assessing the risk value. That is, path determiner 12 determines, as the path leading to asset B, the logical path that passes through BT driver 32 having a higher attack feasibility level than USB driver 33 and I2C driver 34, and the physical path corresponding to the logical path. Specifically, the physical path that passes through "smartphone 91, BT interface 21, and Main microcomputer 24" plus the logical path that passes through "virtualization board 31, BT driver 32, second OS 36, and second function 39" are determined as the path leading to asset B. Similarly, path determiner 12 determines, as the path leading to asset C, the logical path that passes through BT driver 32 having a higher attack feasibility level than USB driver 33 and I2C driver 34, and the physical path corresponding to the logical path. Specifically, the physical path that passes through "smartphone 91, BT interface 21, and Main microcomputer 24" plus the logical path that passes through "virtualization board 31, BT driver 32, second OS 36, container 37, and third function 40" are determined as the path leading to asset C.

Accordingly, for asset A, risk re-assessment unit 13 derives the same risk value of "2" as the risk value assessed at the time of assessment. On the other hand, for asset B, risk re-assessment unit 13 derives a risk value of "4" that is different from the risk value of "2" derived at the time of assessment and, for asset C, derives a risk value of "3" that is different from the risk value of "1" derived at the time of assessment. In this way, the risk values of assets A, B, and C are re-assessed.

In this case, the amount of change in the risk value of asset A is "0", the amount of change in the risk value of asset B is "+2", and the amount of change in the risk value of asset C is "+2". Therefore, priority determiner 15 calculates a risk-value variation of "+4" as a total sum of the amounts of change as shown in (b) in FIG. 7. As a result, priority determiner 15 determines "High" as the priority of vulnerability D.

As shown in (a) and (b) in FIG. 7, in the case where vulnerability assessment information D4 indicates vulnerability F of USB driver 33, similar processing is performed as in the case where vulnerability assessment information D4 indicates vulnerability D of first OS 35.

In the aforementioned example, in the case where vulnerability assessment information D4 indicates the vulnerability of a logical component, separation-settings identifier 12*a* determines that there is no separation mechanism set for the logical component. Alternatively, in the case where the CVSS score value of the vulnerability is greater than or equal to a threshold value, separation-settings identifier 12*a* may determine that there is no separation mechanism set for the logical component corresponding to the vulnerability. As another alternative, in the case where the risk-value variation for the vulnerability is less than a first threshold value, priority determiner 15 may determine "Low" as the priority of the vulnerability. Then, in the case where the risk-value variation for the vulnerability is greater than or equal to the first threshold value and less than a second threshold value, priority determiner 15 may determine "Medium" as the priority of the vulnerability, and in the case where the risk-value variation for the vulnerability is greater than or equal to the second threshold value, priority determiner 15 may determine "High" as the priority of the vulnerability.

Although in the aforementioned example, priority determiner 15 calculates the risk-value variation, priority determiner 15 may calculate a different parameter. For example, the parameter may be a total of the re-assessed risk values of a plurality of assets, or may be the number of risk values that indicate a predetermined maximum value of "5" among the re-assessed risk values of a plurality of assets. That is, for each of the vulnerability of at least one logical component indicated by vulnerability assessment information D4, priority determiner 15 determines the priority for the vulnerability in accordance with (a) the total of the re-assessed risk values of the assets, (b) the number of risk values that indicate the predetermined maximum value of "5" among the re-assessed risk values of the assets, or (c) the total of the amounts of change in the re-assessed risk values of the assets. Note that the total of the amounts of change in the re-assessed risk values corresponds to the aforementioned risk-value variation.

Figure 8:
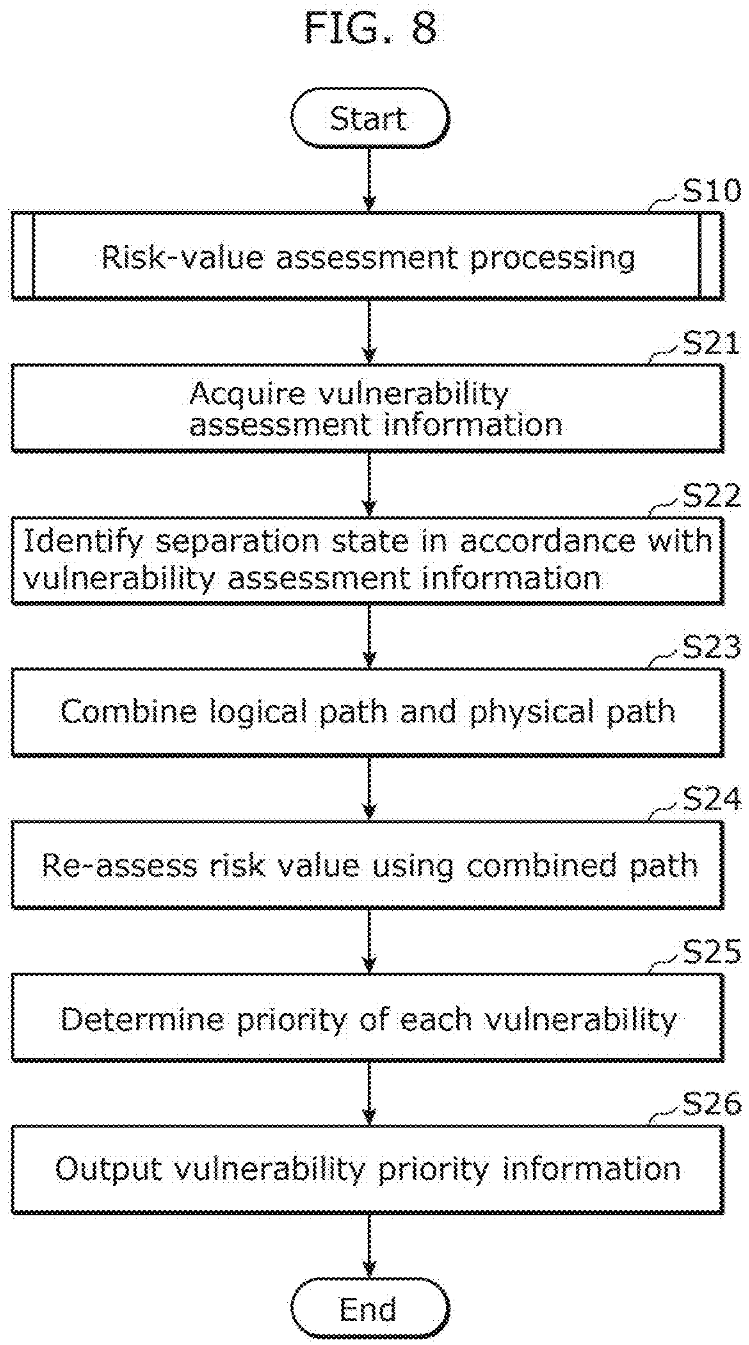
FIG. 8 is a flowchart showing one example of processing operations of the assessment apparatus according to Embodiment 2.

FIG. 8 is a flowchart showing one example of the processing operations of assessment apparatus 10*a*.

First, assessment apparatus 10*a* executes the processing for assessing the risk values (step S10). That is, assessment apparatus 10*a* executes the processing in steps S11 to S14 or in steps S11 to S15 in the flowchart shown in FIG. 5.

Then, input unit 11 of assessment apparatus 10*a* acquires vulnerability assessment information D4 (step S21). Then, for each of a plurality of vulnerabilities indicated by vulnerability assessment information D4, separation-settings identifier 12*a* identifies a separation state that is set for the plurality of logical components included in assessment target device 20, in accordance with the vulnerability and logical configuration information D1 (step S22).

Then, for each of the vulnerabilities and for each of the assets, path combiner 12*b* combines the logical path leading to the asset and the physical path corresponding to the logical path in accordance with the separation state corresponding to the vulnerability (step S23). For each of the vulnerabilities and for each of the assets, risk re-assessment unit 13 re-assesses the risk value of the asset by using the combined path of the logical path and the physical path (step S24). Then, for each of the vulnerabilities, priority determiner 15 determines the priority for the vulnerability in accordance with the re-assessed risk values of the assets (step S25). At this time, priority determiner 15 may calculate a parameter such as the aforementioned risk-value variation and determine the priority in accordance with the calculated parameter.

Then, output unit 14 generates and outputs vulnerability priority information D5 that indicates the priority for each of the vulnerabilities (step S26). Note that output unit 14 may include a parameter such as the risk-value variation in vulnerability priority information D5, or may include, instead of the priority, the above parameter in vulnerability priority information D5. Output unit 14 may further output asset risk information D3 that indicates the result of the processing performed in step S10, or may output asset risk information D3 that indicates the re-assessed risk values of the assets obtained by the processing in step S24.

Although in the aforementioned example, input unit 11 acquires vulnerability assessment information D4 after having acquired logical configuration information D1 and threat analysis information D2, vulnerability assessment information D4 may be acquired with the same timing as logical configuration information D1 and threat analysis information D2. That is, logical configuration information D1, threat analysis information D2, and vulnerability assessment information D4 may be acquired in any order by input unit 11.

Although in the aforementioned example, the processing for assessing the risk values is performed in step S10, this assessment processing may not be performed. For example, in the case where priority determiner 15 calculates not the risk-value variation, but the total of the re-assessed risk values or the number of maximum risk values as the aforementioned parameter, the processing for assessing the risk values may not be performed. In this case, input unit 11 acquires logical configuration information D1 and threat analysis information D2 in step S10.

In this way, in the present embodiment, the risk value of an asset is re-assessed for each vulnerability in accordance with the logical path corresponding to the vulnerability, and the priority of mitigation to be taken against the vulnerability is determined in accordance with the re-assessed risk value.

Therefore, it is possible to derive an appropriate priority for the vulnerability and to improve the safety of assessment target device 20 by taking mitigation appropriate to the priority. The priority of the mitigation to be taken against the vulnerability is also determined in accordance with the re-assessed risk values of a plurality of assets. Therefore, it is possible to derive an appropriate priority from the viewpoint of the plurality of assets and to effectively improve the safety of assessment target device 20 by taking mitigation appropriate to the priority. Besides, the priority is determined for each vulnerability in accordance with the total of the re-assessed risk values of the assets, the number of maximum risk values, or the total of the amounts of change in the risk values. Thus, it is possible to derive an appropriate priority according to the purpose.

Assessment apparatus 10*a* according to the present embodiment can also be said to be an apparatus described below. That is, assessment apparatus 10*a* is an apparatus that assesses assessment target device 20 that includes a plurality of physical components that execute processing and correspond to a plurality of logical components, and includes input unit 11, path determiner 12, risk re-assessment unit 13, and priority determiner 15. Input unit 11 acquires device information about assessment target device 20 and vulnerability assessment information D4 that indicates a vulnerability of at least one logical component among the logical components of assessment target device 20. For each of the vulnerability of at least one logical component indicated by vulnerability assessment information D4, path determiner 12 determines a logical path including an array of one or more logical components and a physical path corresponding to the logical path and including an array of one or more physical components in accordance with the vulnerability and the device information, the logical path and the physical path being paths of access to each asset of assessment target device 20 from an outside of assessment target device 20, the asset being data or a function. For each of the vulnerability of at least one logical component, risk re-assessment unit 13 assesses the risk value of each asset in accordance with the attack feasibility level and the influence level, the attack feasibility level indicating the level of attack feasibility for the physical path and the logical path that have been acquired, the influence level indicating an influence to be exerted when the asset is invaded. Priority determiner 15 determines, for each of the vulnerability of at least one logical component, the priority of mitigation to be taken against the vulnerability in accordance with the assessed risk value of the asset.

In this way, for each vulnerability, the risk values of assets are determined in accordance with the logical path corresponding to the vulnerability, and the priority of mitigation to be taken against the vulnerability is determined in accordance with the assessed risk values. Accordingly, it is possible to derive an appropriate priority for the vulnerability and to improve the safety of assessment target device 20.

Embodiment 3

Figure 9:
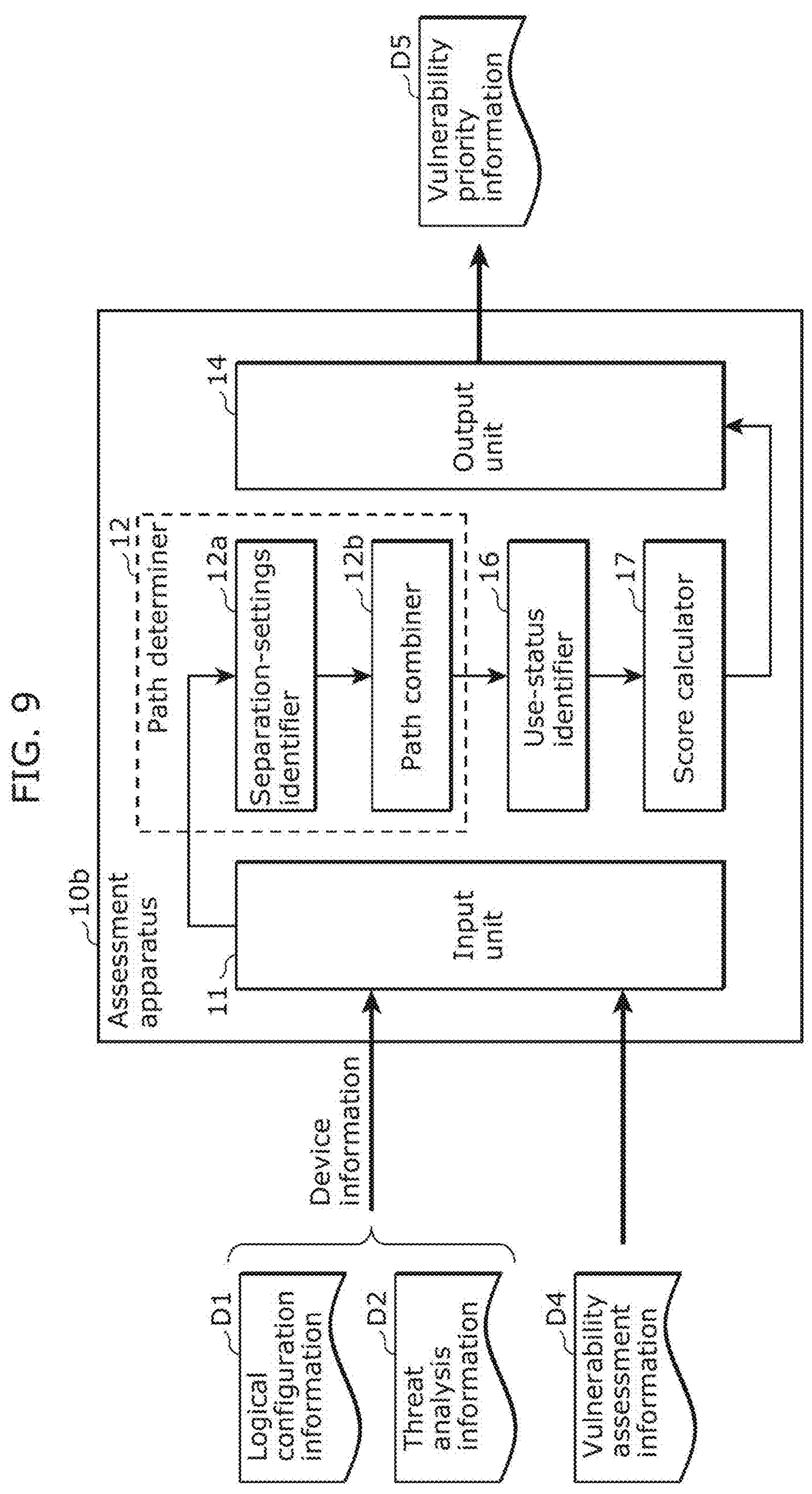
FIG. 9 is a block diagram showing one example of a configuration of an assessment apparatus according to Embodiment 3.

FIG. 9 is a block diagram showing one example of a configuration of an assessment apparatus according to the present embodiment.

Like assessment apparatus 10 according to Embodiment 1, assessment apparatus 10*b* according to the present embodiment includes input unit 11, path determiner 12, and output unit 14 and further includes use-status identifier 16 and score calculator 17.

As in Embodiment 2, input unit 11 according to the present embodiment acquires not only logical configuration information D1 and threat analysis information D2 but also vulnerability assessment information D4. Vulnerability assessment information D4 indicates, as a score value, a vulnerability of at least one logical component among a plurality of logical components included in an assessment target device. Note that the score value is a CVSS score value.

As in Embodiments 1 and 2, path determiner 12 determines logical paths leading to a plurality of assets.

For each of the vulnerability of at least one logical component indicated by vulnerability assessment information D4, use-status identifier 16 identifies the CVSS score value of the vulnerability and the use status of the logical component corresponding to the vulnerability, being used by the plurality of assets. Use-status identifier 16 identifies the use status of the logical component by using the logical paths leading to the assets determined by path determiner 12.

For each of the vulnerability of at least one logical component indicated by vulnerability assessment information D4, score calculator 17 calculates the priority of mitigation to be taken against the vulnerability as a priority score value in accordance with the CVSS score value of the vulnerability and the use status of the logical component corresponding to the vulnerability, being used by the assets.

Output unit 14 generates vulnerability priority information D5 and outputs vulnerability priority information D5 to the outside of assessment apparatus 10*b*, the vulnerability priority information being information about the priority score value calculated for each of the vulnerability of at least one logical component indicated by vulnerability assessment information D4.

FIG. 10 is a diagram for describing the calculation of the priority score values.

For example, vulnerability assessment information D4 indicates vulnerability D of first OS 35, vulnerability E of virtualization board 31, and vulnerability F of USB driver 33 as shown in (a) in FIG. 10. Specifically, vulnerabilities D, E, and F are indicated as the CVSS score values. For example, the CVSS score value of vulnerability D is "8.0", the CVSS score value of vulnerability E is "4.0", and the CVSS score value of vulnerability F is "5.0".

As in Embodiment 1 or 2, path determiner 12 determines the logical paths leading to assets A, B, and C.

For each of vulnerabilities D, E, and F indicated by vulnerability assessment information D4, use-status identifier 16 identifies the use status of the logical component corresponding to the vulnerability, being used by assets A, B, and C. Specifically, use-status identifier 16 identifies the use status of first OS 35 corresponding to vulnerability D, being used by assets A, B, and C. For example, first OS 35 is present only on the logical path leading to asset A and is not present on the logical paths leading to assets B and C. Thus, use-status identifier 16 identifies a state in which first OS 35 is used by only asset A and is not used by assets B and C as the use status of first OS 35 corresponding to vulnerability D. That is, use-status identifier 16 identifies the number of assets using first OS 35, i.e., "1", as the use status of first OS 35 corresponding to vulnerability D. In other words, use-status identifier 16 identifies the frequency of use of assets by first OS 35, i.e., "1", as the use status.

Similarly, use-status identifier 16 identifies the use status of virtualization board 31 corresponding to vulnerability E, being used by assets A, B, and C. Specifically, virtualization board 31 is present on the logical paths leading to assets A, B, and C. Thus, use-status identifier 16 identifies a state in which virtualization board 31 is used by assets A, B, and C as the use status of virtualization board 31 corresponding to vulnerability E. That is, use-status identifier 16 identifies the number of assets using virtualization board 31, i.e., "3", as the use status of virtualization board 31 corresponding to vulnerability E. In other words, use-status identifier 16 identifies the frequency of use of assets by virtualization board 31, i.e., "3", as the use status.

Similarly, use-status identifier 16 identifies the use status of USB driver 33 corresponding to vulnerability F, being used by assets A, B, and C. Specifically, USB driver 33 is present on the logical paths leading to assets B and C and is not present on the logical path leading to asset A. Thus, use-status identifier 16 identifies a state in which USB driver 33 is used by assets B and C and is not used by asset A as the use status of USB driver 33 corresponding to vulnerability F. That is, use-status identifier 16 identifies the number of assets using USB driver 33, i.e., "2", as the use status of USB driver 33 corresponding to vulnerability F. In other words, use-status identifier 16 identifies the frequency of use of assets by USB driver 33, i.e., "2", as the use status.

In this way, use-status identifier 16 identifies the use status of the logical component corresponding to each vulnerability, being used by a plurality of assets, as the number of assets using the logical component, i.e., as the frequency of use of assets. Specifically, the frequency of use of each of vulnerabilities D, E, and F is identified through the processing performed by use-status identifier 16 as shown in (b2) in FIG. 10.

For each of vulnerabilities D, E, and F, score calculator 17 multiples the CVSS score value of the vulnerability shown in (b1) in FIG. 10 by the frequency of use of assets for the vulnerability shown in (b2) in FIG. 10. As a result, score calculator 17 calculates priority score values of vulnerabilities D, E, and F as shown in (b3) in FIG. 10. In this way, score calculator 17 calculates each priority score value by multiplying the CVSS score value and the frequency of use of assets together. Score calculator 17 may also determine a priority level of the priority score value for each vulnerability. The priority level may be expressed as, for example, "Low", "Medium", or "High". For example, if the priority score value of the vulnerability is less than a third threshold value, score calculator 17 may determine "Low" as the priority level of the vulnerability. If the priority score value of the vulnerability is greater than or equal to the third threshold value and less than a fourth threshold value, score calculator 17 may determine "Medium" as the priority level of the vulnerability, and if the priority score value of the vulnerability is greater than or equal to the fourth threshold value, score calculator 17 may determine "High" as the priority level of the vulnerability. That is, the priority score value indicates a detailed priority, and the priority level indicates a coarse priority.

Figure 11:
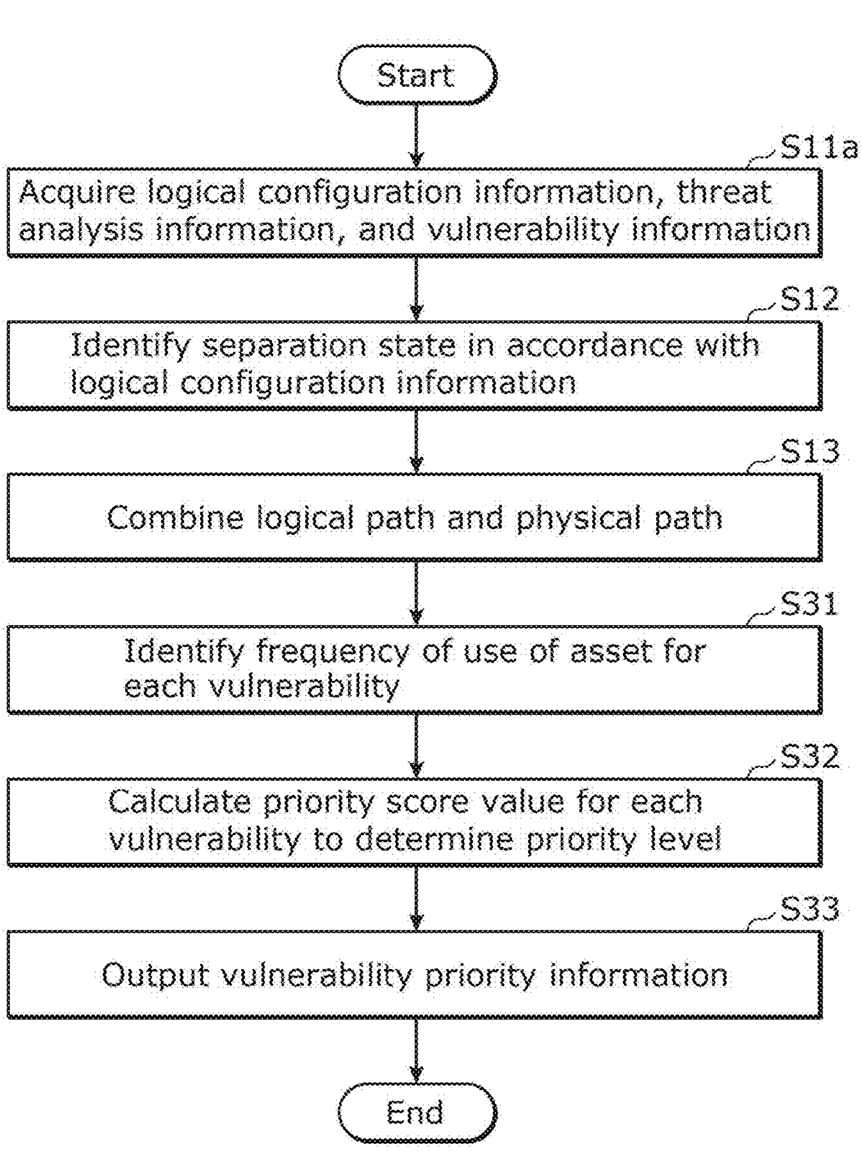
FIG. 11 is a flowchart showing one example of processing operations of the assessment apparatus according to Embodiment 3.

FIG. 11 is a flowchart showing one example of the processing operations of assessment apparatus 10*b*.

First, input unit 11 of assessment apparatus 10*b* acquires logical configuration information D1, threat analysis information D2, and vulnerability assessment information D4 (step S11*a*). Then, as in Embodiment 1, assessment apparatus 10*b* executes the processing in steps S12 and S13. Then, use-status identifier 16 identifies the frequency of use of assets for each vulnerability indicated by vulnerability assessment information D4 as the use status (step S31). Then, for each vulnerability indicated by vulnerability assessment information D4, score calculator 17 calculates the priority score value by multiplying the CVSS score value of the vulnerability and the frequency of use of assets for the vulnerability together. Score calculator 17 further determines the priority level for the calculated priority score value (step S32). For each vulnerability, output unit 14 generates vulnerability priority information D5 and outputs vulnerability priority information D5 to the outside of assessment apparatus 10*b*, the vulnerability priority information indicating the priority score value and the priority level that are calculated or determined for the vulnerability by score calculator 17 (step S33). Note that output unit 14 may include only one of the priority score value and the priority level in vulnerability priority information D5. As in Embodiments 1 and 2, assessment apparatus 10*b* may also assess or re-assess the risk value of each asset. That is, assessment apparatus 10*b* may include risk re-assessment unit 13.

In this way, according to the present embodiment, it is possible to derive the priority as the priority score value without using the risk values of assets and to improve the degree of flexibility in deriving the priority. Besides, since a higher priority is derived for the vulnerability as the number of assets using the logical component corresponding to the vulnerability increases, it is possible to derive an appropriate priority.

Assessment apparatus 10*b* according to the present embodiment can also be said to be an apparatus described below. That is, assessment apparatus 10*b* is an apparatus that assesses assessment target device 20 that includes a plurality of physical components for executing processing appropriate to a plurality of logical components, and includes input unit 11, path determiner 12, and score calculator 17. Assessment target device 20 includes a plurality of assets each being data or a function. Input unit 11 acquires device information about assessment target device 20 and vulnerability assessment information D4 that indicates, as a score value, a vulnerability of at least one logical component among the logical components. For each of the vulnerability of at least one logical component indicated by vulnerability assessment information D4 and for each of the assets, path determiner 12 determines a logical path including an array of one or more logical components in accordance with the vulnerability and the device configuration, the logical path being a path of access to the asset from the outside of assessment target device 20. For each of the vulnerability of at least one logical component indicated by vulnerability assessment information D4, score calculator 17 calculates the priority of mitigation to be taken against the vulnerability as the priority score value in accordance with the score value of the vulnerability and the use status of the logical component corresponding to the vulnerability, being used by the assets.

Accordingly, it is possible to derive the priority as the priority score value without using the risk values of the assets and to improve the degree of flexibility in deriving the priority.

Embodiment 4

In Embodiment 1, the re-assessment of risk is performed by combining the physical path and the logical path. However, the physical configuration may be unknown or undetermined at the time of assessing risk in the case of using virtualization board 31 whose function to be assessed may, for example, be Hypervisor or Docker. In such a case, the risk values may be individually assessed in advance by using only the logical paths. A procedure of processing performed in such a case will be described hereinbelow.

Assessment apparatus 10 according to the present embodiment will be described with reference to FIG. 2.

Assessment apparatus 10 according to the present embodiment is an apparatus that assesses the safety of assessment target device 20 that executes processing appropriate to a plurality of logical components, and assesses the risk value of each asset that has been assessed by the threat analysis devices as described above. Assessment apparatus 10 includes input unit 11, path determiner 12, risk re-assessment unit 13, and output unit 14.

Input unit 11 acquires logical configuration information D1 and threat analysis information D2 about assessment target device 20. Logical configuration information D1 indicates a logical configuration of assessment target device 20. The logical configuration can also be said to be a software configuration and hierarchically defines the dependence of software components. Logical configuration information D1 may also indicate a software parts list, i.e., software bills of materials (SBOM). Threat analysis information D2 may indicate, for example, the risk value of each asset assessed by the threat analysis device, the influence level of each asset, and one or more attack paths.

Path determiner 12 makes determination by using only logical paths. That is, path determiner 12 determines, based on the device information, a logical path including an array of one or more logical components, the logical path being a path of access to an asset of assessment target device from the outside of assessment target device 20, the asset being data or a function.

Note that the logical components may, for example, be software. The logical path may also be referred to as the logical path leading to the asset. Path determiner 12 includes separation-settings identifier 12*a* and path combiner 12*b*. Separation-settings identifier 12*a* identifies a separation state set for the logical configuration of assessment target device 20, i.e., a separation state set for the plurality of logical components. Path combiner 12*b* determines the logical path in accordance with the identified separation state.

Risk re-assessment unit 13 assesses the risk value of each asset in accordance with the separation state of the outside and the logical path combined by path combiner 12*b*. That is, risk re-assessment unit 13 assesses the risk value of the asset in accordance with the attack feasibility level for the logical path determined by path combiner 12*b* and the influence level to be assessed when the asset is invaded. In the present embodiment, since the risk value of each asset has already been assessed by the threat analysis device, risk re-assessment unit 13 re-assesses the risk value of the asset assessed by the threat analysis device. If the risk value of each asset is not assessed in advance by the threat analysis device, i.e., if threat analysis information D2 does not indicate the risk value of each asset, risk re-assessment unit 13 may assess the risk value rather than re-assessing the risk value. In this case, risk re-assessment unit 13 may be referred to as an assessment unit.

Output unit 14 generates information that indicates the risk value of each asset assessed or re-assessed by risk re-assessment unit 13 as asset risk information D3 and outputs asset risk information D3 to the outside of assessment apparatus 10.

In the case where an actual physical configuration allocated to the virtualization board is determined after the aforementioned re-assessment of risk, the assessment of risk may be performed again by using the method described in Embodiment 1.

In this case, it is possible to derive the risk value in accordance with the logical path even if the physical path is unknown. The derived risk value may be combined afterward with the physical path and then re-assessed. Thus, it is possible to expect the effect that the period of risk re-assessment can be shortened in derivative expansion to other physical configurations.

While the assessment apparatus and the assessment method according to one or a plurality of aspects of the present disclosure have been described thus far on the basis of several embodiments, the present disclosure is not intended to be limited to those embodiments. The present disclosure may also include other variations obtained by making various modifications conceivable by those skilled in the art to the embodiments, without departing from the scope of the present disclosure. The present disclosure may also include any combination of constituent elements of a plurality of different embodiments.

For example, in Embodiment 3, score calculator 17 may calculate not only the CVSS score value and the frequency of use of assets but also the priority score value according to, for example, the user, type, or characteristics of assessment target device 20. The characteristics may, for example, be characteristics that indicate whether it is possible to update the logical components.

In Embodiments 2 and 3, the accuracy of the priority determined for each vulnerability indicated by vulnerability assessment information D4 may be improved by determining a detailed logical path according to the vulnerability or the gain size of CVE. For example, while each logical path includes an array of one or more logical components, the one or more logical components may be software, modules included in software, or functions. A detailed logical path may be a path including the aforementioned modules or functions.

In Embodiments 1 to 4, path combiner 12*b* may determine the logical path by using actual test data such as coverage data acquired at the time of verification of assessment target device 20.

In the above-described embodiments, the constituent elements are configured as dedicated hardware, but may be realized by executing a software program appropriate to each constituent element. Each constituent element may be realized by a program executor such as a processor or a central processing unit (CPU) reading out and executing a software program recorded on a recording medium such as a hard disk or semiconductor memory. Here, the software that realizes the assessment apparatus or the like according to each of the above-described embodiments is a computer program for causing a computer to execute each step in the flowcharts shown in FIGS. 5, 8, and 11.

The following cases are also included in the present disclosure.

(1) At least one of the above-described devices may specifically be a computer system configured by, for example, a microprocessor, read-only memory (ROM), random-access memory (RAM), a hard disk unit, a display unit, a keyboard, and a mouse. The RAM or the hard disk unit stores computer programs. At least one of the above-described devices achieves its function as a result of the microprocessor operating in accordance with the computer programs. The computer programs as used herein are configured by a combination of a plurality of instruction codes that indicate commands given to the computer in order to achieve predetermined functions.

(2) Some or all of the constituent elements of at least one of the above-described devices may be configured as a single system large-scale integration (LSI) circuit. The system LSI circuit is a ultra-multifunctional LSI circuit manufactured by integrating a plurality of components on a single chip and is specifically a computer system that may include, for example, a microprocessor, ROM, and RAM. The RAM stores computer programs. The system LSI circuit achieves its function as a result of the microprocessor operating in accordance with the computer programs.

(3) Some or all of the constituent elements of at least one of the above-described devices may be configured as an IC card or a stand-alone module that is detachable from the device. The IC card or the module may be a computer system that may include, for example, a microprocessor, ROM, and RAM. The IC card or the module may include the aforementioned ultra-multifunctional LSI circuit. The IC card or the module may include the aforementioned ultra-multifunctional LSI. The IC card or the module achieves its function as a result of the microprocessor operating in accordance with the computer programs. The IC card or the module may have protection against tampering.

(4) The present disclosure may be implemented as the above-described methods. The present disclosure may also be implemented as a computer program that realizes those methods via a computer, or may be implemented as digital signals generated by the computer program.

The present disclosure may also be implemented by recording computer programs or digital signals on a computer-readable recording medium such as a flexible disk, a hard disk, compact disc (CD)-ROM, a DVD, DVD-ROM, DVD-RAM, a Blu-ray (BD: registered trademark) disc, or semiconductor memory. The present disclosure may also be implemented as digital signals recorded on those recording media.

The present disclosure may be implemented by transmitting computer programs or digital signals via, for example, telecommunication lines, wireless or wired communication lines, networks typified by the Internet, or data broadcasts.

The present disclosure may also be implemented as another independent computer system by transferring programs or digital signals recorded on a recording medium or by transferring programs or digital signals via a network or the like.

Further Information about Technical Background to this Application

The disclosures of the following patent application including specification, drawings, and claims are incorporated herein by reference in their entirety: Japanese Patent Application No. 2023-208864 filed on Dec. 11, 2023 and Japanese Patent Application No. 2024-131786 filed on Aug. 8, 2024.

INDUSTRIAL APPLICABILITY

The assessment apparatus according to the present disclosure is applicable to, for example, an apparatus or a system that assesses an ECU or the like incorporated in, for example, a vehicle.

While various embodiments have been described herein above, it is to be appreciated that various changes in form and detail may be made without departing from the spirit and scope of the present disclosure as presently or hereafter claimed.

The invention claimed is:

1. An assessment apparatus that assesses an assessment target device that includes a plurality of physical components for executing processing appropriate to a plurality of logical components, the assessment apparatus comprising:

a processor; and memory connected to the processor, wherein using the memory, the processor:

acquires device information about the assessment target device;

determines, based on the device information, a logical path including an array of one or more logical components and a physical path corresponding to the logical path and including an array of one or more physical components, the logical path and the physical path being paths of access to an asset of the assessment target device from an outside of the assessment target device, the asset being data or a function; and assesses a risk value of the asset in accordance with an attack feasibility level and an influence level, the attack feasibility level indicating a level of attack feasibility on the physical path and the logical path that have been determined, the influence level indicating an influence to be exerted when the asset is invaded, wherein in the determining of the logical path and the physical path, the processor:

identifies a separation state that is set for the plurality of logical components; and combines the physical path and the logical path by determining the logical path in accordance with the separation state identified and determining the physical path corresponding to the logical path, and wherein in the assessing of the risk value of the asset, the processor assesses the risk value of the asset in accordance with the physical path and the logical path that have been combined.

2. The assessment apparatus according to claim 1, wherein the processor further acquires vulnerability assessment information that indicates one or more vulnerabilities of one or more logical components among the plurality of logical components, in the determining of the logical path and the physical path:

for each of the one or more vulnerabilities of the one or more logical components indicated by the vulnerability assessment information, the processor further re-determines the physical path and the logical path in accordance with the vulnerability, and in the assessing of the risk value of the asset:

for each of the one or more vulnerabilities of the one or more logical components, the processor further re-assesses the risk value of the asset in accordance with the physical path and the logical path that have been re-determined, and the processor further determines, for each of the vulnerability of at least one logical component, a priority of mitigation to be taken against the vulnerability in accordance with the risk value of the asset re-assessed.

3. The assessment apparatus according to claim 2, wherein the assessment target device includes a plurality of assets including the asset, for each of the plurality of assets, the processor:

(a) re-determines the physical path and the logical path that lead to the asset; and (b) re-assesses the risk value of the asset in accordance with the physical path and the logical path that have been re-determined, and in the determining of the priority:

for each of the one or more vulnerabilities of the one or more logical components, the processor determines the priority for the vulnerability in accordance with the risk values of the plurality of assets re-assessed.

4. The assessment apparatus according to claim 3, wherein in the determining of the priority:

for each of the one or more vulnerabilities of the one or more logical components, the processor determines the priority for the vulnerability in accordance with (a) a total of the risk values of the plurality of assets re-assessed, (b) a total number of risk values that indicates a predetermined maximum value among the risk values of the plurality of assets re-assessed, or (c) a total of amounts of change in the risk values of the plurality of assets re-assessed.

5. The assessment apparatus according to claim 1, wherein the processor further acquires vulnerability assessment information that indicates, as a score value, a vulnerability of at least one logical component among the plurality of logical components, the assessment target device includes a plurality of assets including the asset, and in the determining of the logical path and the physical path:

the processor determines the logical path for each of the plurality of assets; and for each of the one or more vulnerabilities of the one or more logical components indicated by the vulnerability assessment information, the processor further assesses a priority of mitigation to be taken against the vulnerability as a priority score value in accordance with the score value of the vulnerability and a use status of a logical component corresponding to the vulnerability, being used by the plurality of assets.

6. The assessment apparatus according to claim 5, wherein the processor further identifies the use status of the logical component corresponding to the vulnerability, being used by the plurality of assets, as a total number of assets using the logical component, and in the calculating of the priority score value, the processor calculates the priority score value by multiplying the score value and the total number of assets together.

7. An assessment apparatus that assesses an assessment target that executes processing appropriate to a plurality of logical components, the assessment apparatus comprising:

a processor; and memory connected to the processor, wherein the processor uses the memory to:

acquire configuration information about the assessment target;

determine a logical path including an array of one or more logical components in accordance with the configuration information, the logical path being a path of access to an asset of the assessment target from an outside of the assessment target, the asset being data or a function; and assess a risk value of the asset in accordance with an attack feasibility level and an influence level, the attack feasibility level indicating a level of attack feasibility on the logical path determined, the influence level indicating an influence to be exerted when the asset is invaded, wherein in the determining of the logical path, the processor identifies a separation state that is set for the plurality of logical components, and determines the logical path in accordance with the separation state identified.

8. An assessment method for causing a computer to assess an assessment target device that includes a plurality of physical components for executing processing appropriate to a plurality of logical components, the assessment method comprising:

acquiring device information about the assessment target device;

determining, based on the device information, a logical path including an array of one or more logical components and a physical path corresponding to the logical path and including an array of one or more physical components, the logical path and the physical path being paths of access to an asset of the assessment target device from an outside of the assessment target device, the asset being data or a function; and assessing a risk value of the asset in accordance with an attack feasibility level and an influence level, the attack feasibility level indicating a level of attack feasibility on the physical path and the logical path that have been determined, the influence level indicating an influence to be exerted when the asset is invaded, wherein the determining of the logical path and the physical path includes identifying a separation state that is set for the plurality of logical components, and combining the physical path and the logical path by determining the logical path in accordance with the separation state identified and determining the physical path corresponding to the logical path, and wherein the assessing of the risk value of the asset includes assessing the risk value of the asset in accordance with the physical path and the logical path that have been combined.

9. An assessment method for causing a computer to assess an assessment target that executes processing appropriate to a plurality of logical components, the assessment method comprising:

acquiring configuration information about the assessment target;

determining a logical path including an array of one or more logical components in accordance with the configuration information, the logical path being a path of access to an asset of the assessment target from an outside of the assessment target, the asset being data or a function; and assessing a risk value of the asset in accordance with an attack feasibility level and an influence level, the attack feasibility level indicating a level of attack feasibility on the logical path determined, the influence level indicating an influence to be exerted when the asset is invaded, wherein the determining of the logical path includes identifying a separation state that is set for the plurality of logical components, and determining the logical path in accordance with the separation state identified.

* * * * *